United States Patent
Chen et al.

(10) Patent No.: US 10,999,210 B2
(45) Date of Patent: May 4, 2021

(54) LOAD SHARING METHOD AND NETWORK DEVICE

(71) Applicant: Huawei Technologies Co., Ltd., Shenzhen (CN)

(72) Inventors: Lihao Chen, Beijing (CN); Mingui Zhang, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/517,224

(22) Filed: Jul. 19, 2019

(65) Prior Publication Data

US 2019/0342227 A1  Nov. 7, 2019

Related U.S. Application Data

(63) Continuation of application No. PCT/CN2017/109132, filed on Nov. 2, 2017.

(30) Foreign Application Priority Data

Jan. 20, 2017   (CN) .......................... 201710048343.9

(51) Int. Cl.
*H04L 12/863* (2013.01)
*H04L 12/46* (2006.01)
(Continued)

(52) U.S. Cl.
CPC ...... *H04L 47/6255* (2013.01); *H04L 12/4633* (2013.01); *H04L 45/745* (2013.01);
(Continued)

(58) Field of Classification Search
CPC .............. H04L 47/6255; H04L 12/4633; H04L 45/745; H04L 47/20; H04L 47/2466; H04L 47/624; H04L 2212/00
See application file for complete search history.

(56) References Cited

U.S. PATENT DOCUMENTS

2014/0321376 A1   10/2014  Damnjanovic et al.
2015/0295828 A1*  10/2015  Lan ........................ H04L 47/11
                                              370/235
(Continued)

FOREIGN PATENT DOCUMENTS

CN         102868629 A      1/2013
CN         104158752 A     11/2014
(Continued)

OTHER PUBLICATIONS

Machine Translation and Abstract of Chinese Publication No. CN102868629, Jan. 9, 2013, 6 pages.
(Continued)

*Primary Examiner* — Ayaz R Sheikh
*Assistant Examiner* — Louis Samara
(74) *Attorney, Agent, or Firm* — Conley Rose, P.C.

(57) ABSTRACT

A load sharing method includes: establishing a first tunnel and a second tunnel between a first network device and a second network device, where the first tunnel and the second tunnel form a bonding tunnel through hybrid bonding; sending, by the first network device, a plurality of data packets to the second network device; determining, by the first network device, a usage status of buffer space of a bonding tunnel reorder buffer of the second network device based on an acknowledgment response returned by the second network device; and performing, based on the usage status and according to a specified load sharing policy, load sharing between the first tunnel and the second tunnel for a packet to be transmitted by the first network device to the second network device.

20 Claims, 6 Drawing Sheets

(51) Int. Cl.
  *H04L 12/741* (2013.01)
  *H04L 12/813* (2013.01)
  *H04L 12/855* (2013.01)
  *H04L 12/801* (2013.01)

(52) U.S. Cl.
  CPC .......... *H04L 47/20* (2013.01); *H04L 47/2466* (2013.01); *H04L 47/34* (2013.01); *H04L 47/624* (2013.01); *H04L 2212/00* (2013.01)

(56) References Cited

U.S. PATENT DOCUMENTS

| | | | |
|---|---|---|---|
| 2016/0119939 A1* | 4/2016 | Himayat | H04W 72/0446 370/329 |
| 2016/0359765 A1* | 12/2016 | Herrero | H04L 47/2416 |
| 2017/0150401 A1 | 5/2017 | Guo et al. | |

FOREIGN PATENT DOCUMENTS

| | | |
|---|---|---|
| CN | 104158761 A | 11/2014 |
| CN | 105743760 A | 7/2016 |
| CN | 105933232 A | 9/2016 |
| EP | 3182659 A1 | 6/2017 |
| WO | 2014067711 A1 | 5/2014 |
| WO | WO-2016090978 A1 * | 6/2016 ............. H04L 12/46 |

OTHER PUBLICATIONS

Machine Translation and Abstract of Chinese Publication No. CN105743760, Jul. 6, 2016, 34 pages.
Machine Translation and Abstract of Chinese Publication No. CN105933232, Sep. 7, 2016, 30 pages.
Leymann, N., et al, "GRE Notifications for Hybrid Access," draft-lhwxz-gre-notifications-hybrid-access-01.txt, XP015104019, Jan. 14, 2015, 36 pages.
Leymann, N., et al, "Huawei's GRE Tunnel Bonding Protocol," draft-zhang-gre-tunnel-bonding-05.txt, XP015117115, Dec. 21, 2016, 42 pages.
Foreign Communication From a Counterpart Application, European Application No. 17892794.3, Extended European Search Report dated Oct. 10, 2019, 12 pages.
Foreign Communication From a Counterpart Application, PCT Application No. PCT/CN2017/109132, English Translation of International Search Report dated Jan. 31, 2018, 2 pages.
Foreign Communication From a Counterpart Application, PCT Application No. PCT/CN2017/109132, English Translation of Written Opinion dated Jan. 31, 2018, 4 pages.

* cited by examiner

LOAD SHARING METHOD AND NETWORK DEVICE

CROSS-REFERENCE TO RELATED APPLICATIONS

This application is a continuation application of Int'l Patent App. No. PCT/CN2017/109132 filed on Nov. 2, 2017, which claims priority to Chinese Patent App. No. 201710048343.9 filed on Jan. 20, 2017, which are incorporated by reference.

TECHNICAL FIELD

This application relates to the field of communications technologies, and in particular, to a load sharing method and a network device.

BACKGROUND

A hybrid access (HA) network means connecting and binding different access networks for use by a same user. The hybrid access network enables a user to experience a high-speed network. For example, two different types of access networks are a digital subscriber line (DSL) and a Long-Term Evolution (LTE). Currently, a possible manner of implementing HA is as follows: An operator-side network device and a user-side network device implement hybrid bonding of tunnels of different network types by using a generic routing encapsulation (GRE) tunnel. For example, a GRE tunnel is established on a wide area network (WAN) interface of each of the DSL and the LTE, and then the two tunnels are bonded to form one uplink access channel. For message transfer between the operator-side network device and the user-side network device, a message is encapsulated into a GRE packet format and then forwarded between the user-side network device (for example, may be a home gateway (HG)) and the operator-side network device (for example, may be a hybrid access aggregation (HAAP)). The operator-side network device is configured to bind and connect different access networks, to provide high-speed Internet access for a user. The user-side network device can allow concurrent access by two different access networks. For example, the user-side network device can allow concurrent access by a fixed broadband network and a mobile network.

In the prior art, in a hybrid access network, load sharing is implemented based on a token bucket. Two types of access networks, namely, a DSL and LTE, are used as an example. Two tunnels are established between an HAAP and an HG, that is, a DSL tunnel and an LTE tunnel. A transmit end determines a color of a packet based on bandwidth of the DSL tunnel and bandwidth of the LTE tunnel by using a coloring mechanism, and determines, based on the color, whether to send the packet through the DSL tunnel or the LTE tunnel.

As shown in FIG. 1, the transmit end maintains two token buckets: a DSL token bucket (shown in FIG. 1 by using leftward slashes) and an LTE token bucket (shown in FIG. 1 by using rightward slashes). Sizes of the two token buckets are determined based on the bandwidth of the DSL tunnel and the bandwidth of the LTE tunnel. A packet entering the DSL token bucket is marked in green (shown in FIG. 1 by using leftward slashes). A packet beyond a receiving capability of the DSL token bucket enters the LTE token bucket, and the data packet entering the LTE token bucket is marked in yellow (shown in FIG. 1 by using rightward slashes). Finally, a packet in green is sent through the DSL tunnel, and a packet in yellow is sent through the LTE tunnel.

Assuming that the bandwidth of the DSL tunnel and the bandwidth of the LTE tunnel are fixed, the foregoing token bucket-based load sharing mechanism cannot be used to dynamically adjust a load sharing proportion of traffic based on actual statuses of the DSL tunnel and the LTE tunnel, thereby reducing transmission efficiency of the bonding tunnel. For example, in a case in which the DSL tunnel is congested and a delay occurs, when a throughput of the DSL tunnel does not reach subscription bandwidth of the DSL tunnel, a data packet is marked in green, and traffic is still sent through the DSL tunnel in a poor condition. In this case, available bandwidth of the LTE tunnel cannot be properly used by a user, the LTE tunnel is idle, and a delay of the DSL tunnel is increased, resulting in a poor overall throughput of the HA network. In addition, a transmission error such as a packet loss is likely to occur in the DSL tunnel, and system resource utilization is greatly reduced, thereby hindering implementation of a hybrid access technology. For another example, in a case in which the LTE tunnel is congested and a delay occurs, a large quantity of packets transmitted through the DSL tunnel can be reordered only after a packet in the LTE tunnel arrives at a receive end, which may cause a large quantity of packets to accumulate in a reorder buffer, resulting in a reduced overall throughput and a lower throughput of the bonding tunnel than the single DSL tunnel. When the congestion is severe, an overflow may occur in the reorder buffer, which causes packet discarding, and triggers application layer retransmission.

SUMMARY

This application provides a load sharing method and a network device, so as to improve transmission efficiency of a bonding tunnel in a hybrid access network.

According to a first aspect, this application provides a load sharing method. The method is applied to a first network device. A first tunnel and a second tunnel are established between the first network device and a second network device, and the first tunnel and the second tunnel form a bonding tunnel through hybrid bonding. The second network device includes a bonding tunnel reorder buffer, and the bonding tunnel reorder buffer is configured to sort packets entering the bonding tunnel reorder buffer. The first network device may be, for example, an HG device in a hybrid access network, and the second network device may be, for example, an HAAP device in the hybrid access network. Alternatively, the first network device may be, for example, an HAAP device in a hybrid access network, and the second network device may be, for example, an HG device in the hybrid access network. In the method, the first network device sends a plurality of data packets to the second network device, and receives an acknowledgment response sent by the second network device. The acknowledgment response may be specifically an acknowledgment response sent for each packet in the plurality of data packets, an acknowledgment response sent for every several packets, or an acknowledgment response sent according to a specified time interval. The acknowledgment response may be considered as an acknowledgment response of the second network device for the plurality of data packets. Then the first network device determines a usage status of buffer space of the bonding tunnel reorder buffer based on the acknowledgment response, and performs, based on the usage status of the buffer space of the bonding tunnel reorder buffer and according to a specified load sharing policy, load sharing between the first tunnel and the second tunnel for a packet to be transmitted by the first network device to the second network device.

Optionally, the first network device sends the plurality of data packets to the second network device through the first tunnel. Optionally, the first network device sends the plurality of data packets to the second network device through the second tunnel. Optionally, the first network device sends a first part of the plurality of data packets to the second network device through the first tunnel, and the first network device sends a second part of the plurality of data packets to the second network device through the second tunnel.

In the foregoing solution, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved.

In a possible design, the usage status of the buffer space of the bonding tunnel reorder buffer may include a size of buffer space that has been used in the bonding tunnel reorder buffer or a size of available buffer space in the bonding tunnel reorder buffer.

In a possible design, the determining, by the first network device, a usage status of buffer space of the bonding tunnel reorder buffer based on the acknowledgment response specifically includes: determining, by the first network device based on the acknowledgment response, a quantity $F_1$ of packets that have not been correctly sorted in the first tunnel, a quantity $F_2$ of packets that have not been correctly sorted in the second tunnel, and a quantity $F_B$ of packets that have not been correctly sorted in the bonding tunnel; then determining a quantity B of packets in the bonding tunnel reorder buffer, where $B=F_B-F_1-F_2$; and determining the usage status of the buffer space of the bonding tunnel reorder buffer based on the quantity of packets in the bonding tunnel reorder buffer.

In a possible design, the second network device further includes a first tunnel reorder buffer and a second tunnel reorder buffer, the first tunnel reorder buffer is configured to sort packets transmitted through the first tunnel, and the second tunnel reorder buffer is configured to sort packets transmitted through the second tunnel; the sending, by the first network device, a plurality of data packets to the second network device specifically includes: sending, by the first network device, a first part of the plurality of data packets to the second network device through the first tunnel, and sending, by the first network device, a second part of the plurality of data packets to the second network device through the second tunnel; and the receiving, by the first network device, an acknowledgment response sent by the second network device specifically includes: receiving, by the first network device, a first acknowledgment response that is for a first data packet in the first part of data packets and that is sent by the second network device, and determining, based on the first acknowledgment response, a quantity of packets that have entered the first tunnel reorder buffer and have been correctly sorted and a quantity M of packets that have entered the bonding tunnel reorder buffer and have been correctly sorted; receiving, by the first network device, a second acknowledgment response that is for a second data packet in the second part of data packets and that is sent by the second network device, and determining, based on the second acknowledgment response, a quantity of packets that have entered the second tunnel reorder buffer and have been correctly sorted and a quantity N of packets that have entered the bonding tunnel reorder buffer and have been correctly sorted; obtaining, by the first network device based on a quantity of the plurality of data packets sent by the first network device and a larger value in M and N, the quantity $F_B$ of packets that have not been correctly sorted in the bonding tunnel; obtaining, by the first network device based on a quantity of the first part of data packets sent to the second network device and the quantity of packets that have entered the first tunnel reorder buffer and have been correctly sorted, the quantity $F_1$ of packets that have not been correctly sorted in the first tunnel, where the quantity of packets that have entered the first tunnel reorder buffer and have been correctly sorted is determined based on the first acknowledgment response; and obtaining, by the first network device based on a quantity of the second part of data packets sent to the second network device and the quantity of packets that have entered the second tunnel reorder buffer and have been correctly sorted, the quantity $F_2$ of packets that have not been correctly sorted in the second tunnel, where the quantity of packets that have entered the second tunnel reorder buffer and have been correctly sorted is determined based on the second acknowledgment response.

In a possible design, each packet in the first part of data packets includes a bonding tunnel sequence number and a first tunnel sequence number that are of the packet. The first tunnel sequence number is used to indicate a transmission sequence of each packet in the first part of data packets in the first tunnel, and the bonding tunnel sequence number of each packet in the first part of data packets that is included in the packet is used to indicate a transmission sequence of the packet in the bonding tunnel. Each packet in the second part of data packets includes a bonding tunnel sequence number and a second tunnel sequence number of the packet, the second tunnel sequence number is used to indicate a transmission sequence of each packet in the second part of data packets in the second tunnel. The bonding tunnel sequence number of each packet in the second part of data packets that is included in the packet is used to indicate a transmission sequence of the packet in the bonding tunnel. The first acknowledgment response includes a first tunnel acknowledgment sequence number and a bonding tunnel acknowledgment sequence number, and the second acknowledgment response includes a second tunnel acknowledgment sequence number and a bonding tunnel acknowledgment sequence number.

The first network device determines, based on the first tunnel acknowledgment sequence number, the quantity of packets that have entered the first tunnel reorder buffer and have been correctly sorted, and determines, based on the bonding tunnel acknowledgment sequence number included in the first acknowledgment response, the quantity M of packets that have entered the bonding tunnel reorder buffer and have been correctly sorted.

The first network device determines, based on the second tunnel acknowledgment sequence number, the quantity of packets that have entered the second tunnel reorder buffer and have been correctly sorted, and determines, based on the bonding tunnel acknowledgment sequence number included in the second acknowledgment response, the quantity N of packets that have entered the bonding tunnel reorder buffer and have been correctly sorted.

In the foregoing solution, the quantity of packets in the bonding tunnel reorder buffer is determined, and may be used to determine the size of the buffer space that has been used in the bonding tunnel reorder buffer or the size of the available buffer space in the bonding tunnel reorder buffer. Dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated. In addition, in the foregoing solution, a packet sequence number may be carried by using a field already defined in an existing protocol (for example, the GRE protocol), so that the quantity of packets in the bonding tunnel reorder buffer is determined based on the packet sequence number, thereby reducing implementation complexity of the method.

In a possible design, each packet in the first part of data packets includes a sequence number field used to carry the first tunnel sequence number and a bonding sequence number field used to carry the bonding tunnel sequence number; and each packet in the second part of data packets includes a sequence number field used to carry the second tunnel sequence number and a bonding sequence number field used to carry the bonding tunnel sequence number.

In a possible design, the first acknowledgment response is a generic routing encapsulation GRE data packet, an acknowledgment number field included in the GRE data packet is used to carry the first tunnel acknowledgment sequence number, and a bonding acknowledgment number field included in the GRE data packet is used to carry the bonding tunnel acknowledgment sequence number; or the first acknowledgment response is a GRE control packet, and an attribute type-length-value (TLV) field included in the GRE control packet is used to carry the first tunnel acknowledgment sequence number and the bonding tunnel acknowledgment sequence number.

In a possible design, the second acknowledgment response is a GRE data packet, an acknowledgment number field included in the GRE data packet is used to carry the second tunnel acknowledgment sequence number, and a bonding acknowledgment number field included in the GRE data packet is used to carry the bonding tunnel acknowledgment sequence number.

In a possible design, the second acknowledgment response is a GRE control packet, and an attribute TLV field included in the GRE control packet is used to carry the second tunnel acknowledgment sequence number and the bonding tunnel acknowledgment sequence number.

In a possible design, the first network device determines a round trip time RTT of the first tunnel according to a time interval between sending a third data packet in the first part of data packets and receiving an acknowledgement response that is for the third data packet and that is sent by the second network device.

In a possible design, the first network device determines a round trip time RTT of the second tunnel according to a time interval between sending a fourth data packet in the second part of data packets and receiving an acknowledgement response that is for the fourth data packet and that is sent by the second network device.

According to the method for determining a single-tunnel RTT provided in this application, in a dynamic load sharing solution, a single-tunnel RTT can be determined. There is no need to send an additional probe packet to calculate an RTT of a single tunnel, thereby effectively saving network overheads.

In a possible design, when the usage status of the buffer space of the bonding tunnel reorder buffer includes the size of the buffer space that has been used in the bonding tunnel reorder buffer, the size of the buffer space that has been used in the bonding tunnel reorder buffer includes a quantity of packets in the bonding tunnel reorder buffer, a length of a packet queue in the bonding tunnel reorder buffer, or a quantity of buffer slices that have been used in the bonding tunnel reorder buffer.

In a possible design, when the usage status of the buffer space of the bonding tunnel reorder buffer includes the size of buffer space available in the bonding tunnel reorder buffer, the size of buffer space available in the bonding tunnel reorder buffer includes an available length of a packet buffer queue in the bonding tunnel reorder buffer or a quantity of available buffer slices in the bonding tunnel reorder buffer.

In a possible design, the acknowledgment response received by the first network device is a GRE data packet, the GRE data packet includes a bonding reorder buffer size field, and the bonding reorder buffer size field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

In a possible design, the acknowledgment response received by the first network device is a GRE control packet, the GRE control packet includes an attribute TLV field, the attribute TLV field includes a type T field, a length L field, and a value V field, and the V field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

In the foregoing implementations, dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

In a possible design, the specified load sharing policy includes: after the first network device determines that the size of the buffer space that has been used in the bonding tunnel reorder buffer is greater than or equal to a first threshold or the size of the available buffer space in the bonding tunnel reorder buffer is less than or equal to a second threshold, selecting a tunnel with a smaller round trip time RTT in the first tunnel and the second tunnel, or selecting a tunnel with a smaller quantity of packets that have not been correctly sorted in the first tunnel and the second tunnel, to transmit a packet to be sent by the first network device to the second network device.

After the first network device determines that the size of the buffer space that has been used in the bonding tunnel reorder buffer is greater than or equal to a specified threshold, or after the first network device determines that the size of the available buffer space in the bonding tunnel reorder buffer is less than or equal to a specified threshold, the first network device can perform load sharing for a plurality of consecutive packet sequences that subsequently arrive at the second network device, according to the specified load sharing policy, for example, selecting a tunnel with a smaller RTT to transmit the packet sequences, or selecting a tunnel with a smaller quantity of packets that have not been correctly sorted in the single tunnels to transmit the packet sequences, so that the packet sequences are no longer allocated to a tunnel with a large delay or with a larger quantity of packets in the single tunnel. In this way, it can be effectively avoided that more packets are held up in a congested tunnel, which causes a delay of waiting by packets transmitted through a non-congested tunnel in a reorder buffer and/or a possible traffic overflow in the bonding tunnel reorder buffer, thereby effectively reducing packet losses and system retransmissions.

According to a second aspect, this application provides a load sharing method, and the method is applied to a second network device. A first tunnel and a second tunnel are established between the second network device and a first network device. The first tunnel and the second tunnel form a bonding tunnel through hybrid bonding. The second network device includes a bonding tunnel reorder buffer, and the bonding tunnel reorder buffer is configured to sort packets entering the bonding tunnel reorder buffer. The first network device may be, for example, an HG device in a hybrid access network, and the second network device may be, for example, an HAAP device in the hybrid access network. Alternatively, the first network device may be, for example, an HAAP device in a hybrid access network, and the second network device may be, for example, an HG device in the hybrid access network. First, the second network device receives a plurality of data packets sent by the first network device. The second network device obtains information about a usage status of buffer space of the bonding tunnel reorder buffer. Then the second network device sends an acknowledgment response to the first network device. The acknowledgment response includes the information about the usage status of the buffer space of the bonding tunnel reorder buffer. The information is used by the first network device to determine the usage status of the buffer space of the bonding tunnel reorder buffer, and the first network device performs, based on the usage status of the buffer space of the bonding tunnel reorder buffer and according to a specified load sharing policy, load sharing between the first tunnel and the second tunnel for a packet to be transmitted by the first network device to the second network device.

In the foregoing solution, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved.

In a possible design, the usage status of the buffer space of the bonding tunnel reorder buffer includes a size of buffer space that has been used in the bonding tunnel reorder buffer or a size of available buffer space in the bonding tunnel reorder buffer.

In a possible design, the second network device further includes a first tunnel reorder buffer and a second tunnel reorder buffer, the first tunnel reorder buffer is configured to sort packets transmitted through the first tunnel, and the second tunnel reorder buffer is configured to sort packets transmitted through the second tunnel; the receiving, by the second network device, the plurality of data packets sent by the first network device specifically includes: receiving, by the second network device, a first part of the plurality of data packets sent by the first network device through the first tunnel, where each packet in the first part of data packets includes a bonding tunnel sequence number and a first tunnel sequence number that are of the packet, the first tunnel sequence number is used to indicate a transmission sequence of each packet in the first part of data packets in the first tunnel, and the bonding tunnel sequence number of each packet in the first part of data packets that is included in the packet is used to indicate a transmission sequence of the packet in the bonding tunnel; and receiving, by the second network device, a second part of the plurality of data packets sent by the first network device through the second tunnel, where each packet in the second part of data packets includes a bonding tunnel sequence number and a second tunnel sequence number that are of the packet, the second tunnel sequence number is used to indicate a transmission sequence of each packet in the second part of data packets in the second tunnel, and the bonding tunnel sequence number of each packet in the second part of data packets that is included in the packet is used to indicate a transmission sequence of the packet in the bonding tunnel; where the acknowledgment response includes a first acknowledgment response of the second network device for the first part of data packets and a second acknowledgment response of the second network device for the second part of data packets; the second network device obtains a first tunnel sequence number in a latest packet, obtained before the first acknowledgment response is sent, that is in the first tunnel reorder buffer and that has been correctly sorted, and a bonding tunnel sequence number in a latest packet, obtained before the first acknowledgment response is sent, that is in the bonding tunnel reorder buffer and that has been correctly sorted; and the second network device determines a first tunnel acknowledgment sequence number according to the first tunnel sequence number, and determines a bonding tunnel acknowledgement sequence number included in the first acknowledgment response according to the bonding tunnel sequence number in the latest packet, obtained before the first acknowledgment response is sent, that is in the bonding tunnel reorder buffer and that has been correctly sorted, where information about the usage status of the buffer space of the bonding tunnel reorder buffer that is included in the first acknowledgment response includes the first tunnel acknowledgment sequence number and the bonding tunnel acknowledgment sequence number included in the first acknowledgment response. the second network device obtains a second tunnel sequence number in a latest packet, obtained before the second acknowledgment response is sent, that is in the second tunnel reorder buffer and that has been correctly sorted, and a bonding tunnel sequence number in a latest packet, obtained before the second acknowledgment response is sent, that is in the bonding tunnel reorder buffer and that has been correctly sorted; and the second network device determines a second tunnel acknowledgment sequence number according to the second tunnel sequence number, and determines a bonding tunnel acknowledgement sequence number included in the second acknowledgment response according to the bonding tunnel sequence number in the latest packet, obtained before the second acknowledgment response is sent, that is in the bonding tunnel reorder buffer and that has been correctly sorted, where information about the usage status of the buffer space of the bonding tunnel reorder buffer that is included in the second acknowledgment response includes the second tunnel acknowledgment sequence number and the bonding tunnel acknowledgment sequence number included in the second acknowledgment response; and the first tunnel acknowledgment sequence number, the second tunnel acknowledgment sequence number, the bonding tunnel acknowledgment sequence number included in the first acknowledgment response, and the bonding tunnel acknowledgment sequence number included in the second acknowledgment response are used by the first network device to determine a quantity of packets in the bonding tunnel reorder buffer, and the first network device determines the usage status of the buffer space of the bonding tunnel reorder buffer based on the quantity of packets in the bonding tunnel reorder buffer.

The quantity of packets in the bonding tunnel reorder buffer is determined, and may be used to determine the size of the buffer space that has been used in the bonding tunnel reorder buffer or the size of the available buffer space in the bonding tunnel reorder buffer. Dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated. In addition, in the foregoing solution, a packet sequence number may be carried by using a field already defined in an existing protocol (for example, the GRE protocol), so that the quantity of packets in the bonding tunnel reorder buffer is determined based on the packet sequence number, thereby reducing implementation complexity of the method.

In a possible design, the first acknowledgment response is a GRE data packet, an acknowledgment number field included in the GRE data packet is used to carry the first tunnel acknowledgment sequence number, and a bonding acknowledgment number field included in the GRE data packet is used to carry the bonding tunnel acknowledgment sequence number.

In a possible design, the first acknowledgment response is a GRE control packet, and an attribute TLV field included in the GRE control packet is used to carry the first tunnel acknowledgment sequence number and the bonding tunnel acknowledgment sequence number.

In a possible design, the second acknowledgment response is a GRE data packet, an acknowledgment number field included in the GRE data packet is used to carry the second tunnel acknowledgment sequence number, and a bonding acknowledgment number field included in the GRE data packet is used to carry the bonding tunnel acknowledgment sequence number.

In a possible design, the second acknowledgment response is a GRE control packet, and an attribute TLV field included in the GRE control packet is used to carry the second tunnel acknowledgment sequence number and the bonding tunnel acknowledgment sequence number.

In a possible design, when the usage status of the buffer space of the bonding tunnel reorder buffer includes the size of the buffer space that has been used in the bonding tunnel reorder buffer, the information about the usage status of the buffer space of the bonding tunnel reorder buffer includes a quantity of packets in the bonding tunnel reorder buffer, a length of a packet queue in the bonding tunnel reorder buffer, or a quantity of buffer slices that have been used in the bonding tunnel reorder buffer.

In a possible design, when the usage status of the buffer space of the bonding tunnel reorder buffer includes the size of the available buffer space in the bonding tunnel reorder buffer, the information about the usage status of the buffer space of the bonding tunnel reorder buffer includes an available length of a packet buffer queue in the bonding tunnel reorder buffer or a quantity of available buffer slices in the bonding tunnel reorder buffer.

In a possible design, the acknowledgment response sent by the second network device is a generic routing encapsulation GRE data packet, the GRE data packet includes a bonding reorder buffer size field, and the bonding reorder buffer size field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

In a possible design, the acknowledgment response sent by the second network device is a GRE control packet, the GRE control packet includes an attribute TLV field, the attribute TLV field includes a type T field, a length L field, and a value V field, and the V field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

Dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

According to a third aspect, an embodiment of this application provides a first network device configured to perform the method in the first aspect or any possible design of the first aspect. Specifically, the first network device includes a module configured to perform the method in the first aspect or any possible design of the first aspect.

According to a fourth aspect, an embodiment of this application provides a second network device configured to perform the method in the second aspect or any possible design of the second aspect. Specifically, the second network device includes a module configured to perform the method in the second aspect or any possible design of the second aspect.

According to a fifth aspect, an embodiment of this application provides a first network device. The first network device includes an input interface, an output interface, a processor, and a memory. The input interface, the output interface, the processor, and the memory may be interconnected by using a bus system. The memory is configured to store a program, an instruction, or code, and the processor is configured to execute the program, the instruction, or the code in the memory to complete the method in the first aspect or any possible design of the first aspect.

According to a sixth aspect, an embodiment of this application provides a second network device. The second network device includes an input interface, an output interface, a processor, and a memory. The input interface, the output interface, the processor, and the memory may be interconnected by using a bus system. The memory is configured to store a program, an instruction, or code, and the processor is configured to execute the program, the instruction, or the code in the memory to complete the method in the second aspect or any possible design of the second aspect.

According to a seventh aspect, an embodiment of this application provides a communications system, where the communications system includes the first network device in the third aspect or the fifth aspect and the second network device in the fourth aspect or the sixth aspect.

According to an eighth aspect, an embodiment of this application provides a computer-readable storage medium or a computer program product configured to store a computer program, where the computer program is used to execute an instruction of the method in the first aspect, the second aspect, any possible design of the first aspect, or any possible design of the second aspect.

DESCRIPTION OF EMBODIMENTS

To make the objectives, technical solutions, and advantages of this application clearer, the following further describes this application in detail with reference to the accompanying drawings. The described embodiments are merely some rather than all of the embodiments of this application. All other embodiments obtained by a person of ordinary skill in the art based on the embodiments of this application without creative efforts shall fall within the protection scope of this application.

Unless otherwise stated, in the embodiments of this application, ordinal numbers such as "first" and "second" are intended to distinguish between a plurality of objects, and not intended to limit an order, a time sequence, priorities, or importance of the plurality of objects.

The embodiments of this application may be applied to a hybrid access network, and the hybrid access network includes a first network device and a second network device. A first tunnel and a second tunnel are established between the first network device and the second network device. The first tunnel and the second tunnel form a virtual bonding tunnel through bonding connection, which is referred to as a bonding tunnel for short in this application. All packets transmitted between the first network device and the second network device are transmitted through the bonding tunnel. Specifically, all the packets include packets that are separately transmitted through the first tunnel and the second tunnel. Specifically, for example, the bonding tunnel may be a GRE tunnel, a point-to-point tunneling protocol (PPTP) tunnel, or a user datagram protocol (UDP) tunnel. This is not specifically limited in this application. This application is only described by using an example in which the bonding tunnel is formed through hybrid bonding implemented by using GRE. Application scenarios described in the embodiments of this application are intended to describe the technical solutions in the embodiments of this application more clearly, but are not intended to limit the technical solutions provided in the embodiments of this application. A person of ordinary skill in the art may learn that with evolution of network architectures and emergence of a new service scenario, the technical solutions provided in the embodiments of this application are also applicable to a similar technical problem.

Figure 1:
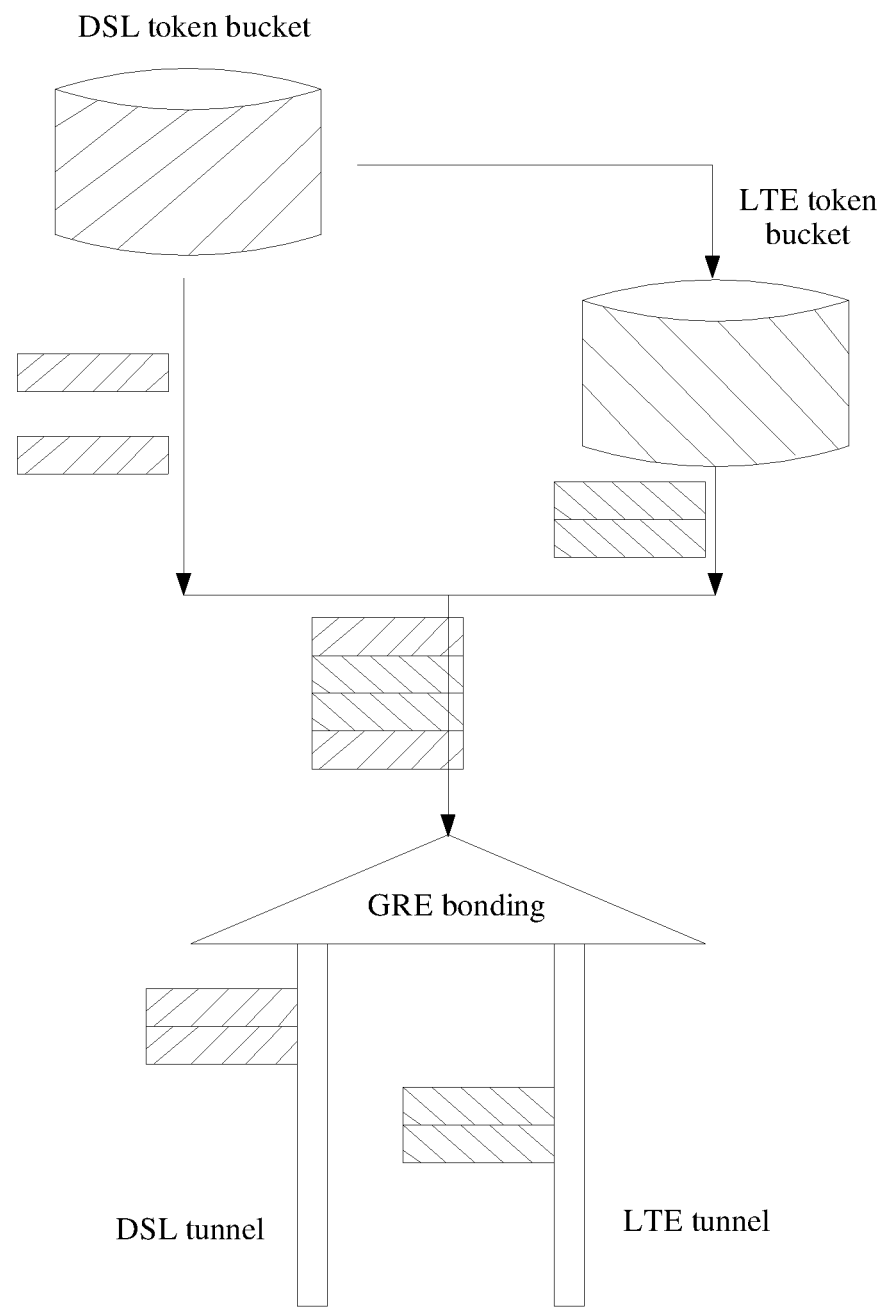
FIG. 1 is a schematic diagram of implementing load sharing based on a token bucket in the prior art.
Figure 2:
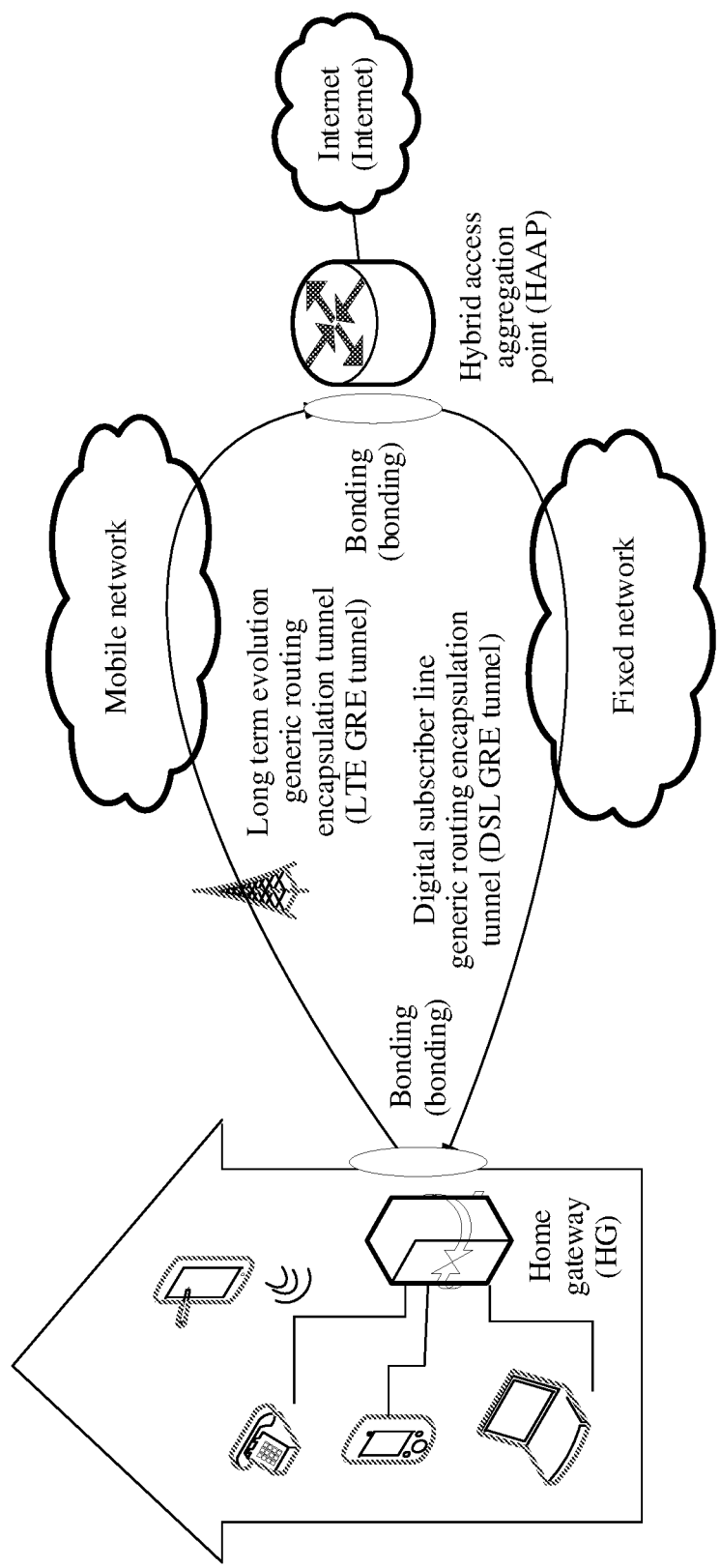
FIG. 2 is a schematic diagram of a network architecture of a hybrid access network according to an embodiment of this application.

FIG. 2 shows an example of a possible architecture of a hybrid access network. A terminal device such as a mobile phone, a phone, and a notebook computer may be connected to an HG device in an access manner such as a network cable or a Wi-Fi network. The HG device may access both a DSL and LTE. The HG device sends an LTE tunnel request and a DSL tunnel request to an HAAP device to establish GRE tunnels respectively (shown in FIG. 2 by using an LTE GRE tunnel and a DSL GRE tunnel), bonds the LTE tunnel and the DSL tunnel to form a bonding tunnel (which may also be referred to as a logical GRE tunnel), accesses the HAAP device, and accesses a public network (such as the Internet) by using the HAAP device. A message between the HG device and the HAAP device is encapsulated into a GRE packet format based on the GRE protocol and then forwarded.

In this application, the first network device may be the HG device, and the second network device may be the HAAP device; or the first network device is the HAAP device, and the second network device is the HG device. All packets sent by the first network device are globally numbered by using bonding tunnel sequence numbers (which may also be referred to as logical GRE tunnel sequence numbers). The bonding tunnel sequence numbers are used to indicate sequence numbers of all the packets sent by the first network device in the bonding tunnel, and are used to indicate a transmission sequence of all the packets in the bonding tunnel. All the packets include a packet transmitted through the DSL tunnel and a packet transmitted through the LTE tunnel. The second network device recovers the sequence of all the packets according to the bonding tunnel sequence numbers, so as to implement a data transmission mechanism of the hybrid access network between the HG and the HAAP.

The following uses an example in which the HG device sends a data stream to the HAAP device for description. It should be understood that the example constitutes no limitation on this application. The HG receives a to-be-sent data stream. The data stream includes six data packets, each data packet includes one bonding tunnel sequence number, and the six bonding tunnel sequence numbers are respectively 1, 2, 3, 4, 5, and 6. The bonding tunnel sequence numbers are used to identify a transmission sequence of the six data packets in the bonding tunnel. The first network device sends data packets whose bonding tunnel sequence numbers are 1 to 4 through the DSL tunnel. When there is no available bandwidth in the DSL, the LTE tunnel is used for load sharing, and is used to transmit data packets whose bonding tunnel sequence numbers are 5 and 6. The HAAP device buffers, by using a bonding tunnel reorder buffer, packets transmitted through the DSL tunnel and the LTE tunnel, and reorders the packets according to a bonding tunnel sequence number carried in each packet. If packets whose bonding tunnel sequence numbers are 1, 2, 5, and 6 enter the bonding tunnel reorder buffer, and packets whose bonding tunnel sequence numbers are 3 and 4 do not arrive at the bonding tunnel reorder buffer due to congestion of the DSL tunnel, packets whose bonding tunnel sequence numbers are 1 and 2 are correctly sorted and output to the network. Packets whose bonding tunnel sequence numbers are 5 and 6 have not been correctly sorted, and can be correctly sorted and then output to the network only after the packets whose bonding tunnel sequence numbers are 3 and 4 enter the bonding tunnel reorder buffer.

It should be noted that in the example of the network architecture shown in FIG. 2, that the bonding tunnel is implemented by bonding the first tunnel and the second tunnel between the first network device and the second network device is merely used as an example for description. Alternatively, more than two tunnels may be bonded between the first network device and the second network device to implement the bonding tunnel for communication.

The application scenario in the hybrid access network shown in FIG. 2 is merely an example, and an actual hybrid access network may include a structure of another form. This is not limited in this application.

Figure 3:
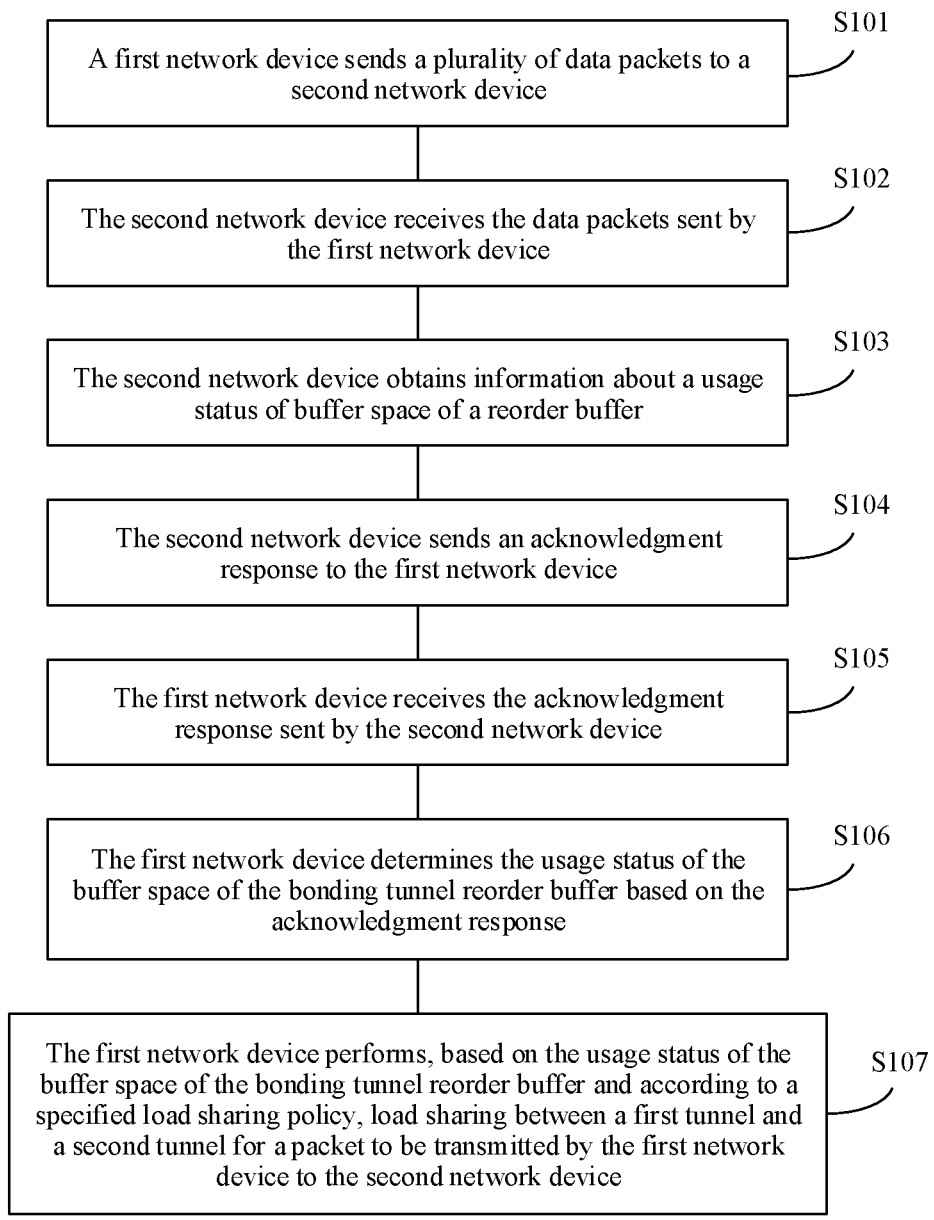
FIG. 3 is a schematic flowchart of a load sharing method according to an embodiment of this application.

The following describes in detail, with reference to FIG. 3, a load sharing method 100 provided in an embodiment of this application based on the hybrid access network architecture shown in FIG. 2. The load sharing method is applied to a first network device and a second network device, and a first tunnel and a second tunnel are established between the first network device and the second network device. The first tunnel and the second tunnel form a bonding tunnel through hybrid bonding. The second network device includes a bonding tunnel reorder buffer, and the bonding tunnel reorder buffer is configured to sort packets entering the bonding tunnel reorder buffer.

In a specific implementation, the first network device may be the HG device shown in FIG. 2, and the second network device may be the HAAP device shown in FIG. 2. Alternatively, the first network device may be the HAAP device shown in FIG. 2, and the second network device may be the HG device shown in FIG. 2. The first tunnel may be the DSL tunnel shown in FIG. 2, and the second tunnel may be the LTE tunnel shown in FIG. 2. Alternatively, the first tunnel may be the LTE tunnel shown in FIG. 2, and correspondingly, the second tunnel may be the DSL tunnel shown in FIG. 2. The load sharing method 100 provided in this embodiment of this application includes the following parts.

S101. The first network device sends a plurality of data packets to the second network device.

Specifically, the first network device receives the plurality of data packets. In an example in which the first network device is the HG, the HG receives the plurality of data packets from a mobile phone or another terminal device. The mobile phone or the another terminal device is connected to the HG by using a network cable or Wi-Fi, and sends the plurality of data packets to the HG.

After receiving the plurality of data packets, the first network device sends the plurality of data packets to the second network device according to a specified load sharing policy, for example, implementing load sharing based on a token bucket. In a specific implementation, the first network device sends the plurality of data packets to the second network device through the first tunnel. In another specific implementation, the first network device sends the plurality of data packets to the second network device through the second tunnel. In another specific implementation, the first network device sends a first part of the plurality of data packets to the second network device through the first tunnel, and the first network device sends a second part of the plurality of data packets to the second network device through the second tunnel.

S102. The second network device receives the plurality of data packets sent by the first network device.

In a specific implementation, the second network device receives the plurality of data packets through the first tunnel. In another specific implementation, the second network device receives the plurality of data packets through the second tunnel. In another specific implementation, that the second network device receives the plurality of data packets sent by the first network device specifically includes: The second network device receives the first part of the plurality of data packets sent by the first network device through the first tunnel; and the second network device receives the second part of the plurality of data packets sent by the first network device through the second tunnel.

S103. The second network device obtains information about a usage status of buffer space of the bonding tunnel reorder buffer.

Specifically, the usage status of the buffer space of the bonding tunnel reorder buffer may include, for example, a size of buffer space that has been used in the bonding tunnel reorder buffer or a size of available buffer space in the bonding tunnel reorder buffer.

In a specific implementation, when the usage status of the buffer space of the bonding tunnel reorder buffer includes the size of the buffer space that has been used in the bonding tunnel reorder buffer, the information about the usage status of the buffer space of the bonding tunnel reorder buffer includes a quantity of packets in the bonding tunnel reorder buffer, a length of a packet queue in the bonding tunnel reorder buffer, or a quantity of buffer slices that have been used in the bonding tunnel reorder buffer. When the usage status of the buffer space of the bonding tunnel reorder buffer includes the size of the available buffer space in the bonding tunnel reorder buffer, the information about the usage status of the buffer space of the bonding tunnel reorder buffer includes an available length of a packet buffer queue in the bonding tunnel reorder buffer or a quantity of available buffer slices in the bonding tunnel reorder buffer.

In another specific implementation, the information about the usage status of the buffer space of the bonding tunnel reorder buffer includes a single tunnel acknowledgment number and a bonding tunnel acknowledgment sequence number. A single tunnel described in this application refers to each of the tunnels that compose the bonding tunnel, for example, the first tunnel or the second tunnel in this embodiment. For specific meanings of the "single tunnel acknowledgment number" and the "bonding tunnel acknowledgment sequence number", and how to determine the "single tunnel acknowledgment number" and the "bonding tunnel acknowledgment sequence number", refer to the following detailed description.

S104. The second network device sends an acknowledgment response to the first network device.

Specifically, the second network device sends the acknowledgment response to the first network device, where the acknowledgment response includes the information about the usage status of the buffer space of the bonding tunnel reorder buffer, and the information is used by the first network device to determine the usage status of the buffer space of the bonding tunnel reorder buffer. The first network device performs, based on the usage status of the buffer space of the bonding tunnel reorder buffer and according to a specified load sharing policy, load sharing between the first tunnel and the second tunnel for a packet to be transmitted by the first network device to the second network device. For a specific manner of sending the acknowledgement response, refer to the following detailed description.

The specified load sharing policy includes but is not limited to: After the first network device determines that the size of the buffer space that has been used in the bonding tunnel reorder buffer is greater than or equal to a first threshold or the size of the available buffer space in the bonding tunnel reorder buffer is less than or equal to a second threshold, selecting a tunnel with a smaller round trip time RTT in the first tunnel and the second tunnel, or selecting a tunnel with a smaller quantity of packets that have not been correctly sorted in the first tunnel and the second tunnel, to transmit a packet to be sent by the first network device to the second network device.

In a specific implementation, each time the second network device receives a packet, the second network device returns an acknowledgment response to the first network device. In another specific implementation, the second network device may set that the second network device periodically returns the acknowledgment response to the first network device at a specific time interval. In another specific implementation, the second network device may alternatively send the acknowledgment response when receiving a request sent by the first network device or when a specified warning state is reached. The specified warning state includes but is not limited to: The size of the buffer space that has been used in the bonding tunnel reorder buffer is greater than or equal to a specified threshold, or the size of the available buffer space in the bonding tunnel reorder buffer is less than or equal to a specified threshold. This is not specifically limited in this application.

S105. The first network device receives the acknowledgment response sent by the second network device.

S106. The first network device determines the usage status of the buffer space of the bonding tunnel reorder buffer based on the acknowledgment response.

Specifically, for how to determine the usage status of the buffer space of the bonding tunnel reorder buffer based on the acknowledgment response, refer to the following detailed description.

S107. The first network device performs, based on the usage status of the buffer space of the bonding tunnel reorder buffer and according to a specified load sharing policy, load sharing between the first tunnel and the second tunnel for a packet to be transmitted by the first network device to the second network device.

Specifically, for how to perform, based on the usage status of the buffer space of the bonding tunnel reorder buffer and according to the specified load sharing policy, load sharing between the first tunnel and the second tunnel for a packet to be transmitted by the first network device to the second network device, refer to the following detailed description.

In the foregoing solution, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved.

The following specifically describes how to send the acknowledgment response in S105 and how to determine the usage status of the buffer space of the bonding tunnel reorder buffer based on the acknowledgment response in S106.

In a specific implementation, that the first network device receives the acknowledgment response sent by the second network device specifically includes: The second network device sends the acknowledgment response to the first network device through the first tunnel or the second tunnel. Correspondingly, the first network device receives the acknowledgement response returned by the second network device through the first tunnel or the second tunnel. The acknowledgment response is a generic routing encapsulation GRE data packet, and the GRE data packet includes a bonding reorder buffer size field. The first network device determines the usage status of the buffer space of the bonding tunnel reorder buffer based on content carried in the bonding reorder buffer size field. For example, the bonding reorder buffer size field may be carried in a header of the GRE packet. The bonding reorder buffer size field may be, for example, 32 bits.

Alternatively, the acknowledgment response is a GRE control packet. The GRE control packet includes an attribute TLV field, and the attribute TLV field includes a type T field, a length L field, and a value V field. The first network device determines the usage status of the buffer space of the bonding tunnel reorder buffer based on content carried in the V field.

When the acknowledgment response is the GRE data packet, the content carried in the bonding reorder buffer size field includes the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

When the acknowledgment response is the GRE control packet, the content carried in the V field includes the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

Specifically, a format of the attribute TLV field in the GRE control packet is shown as follows: an attribute type field, an attribute length field, and an attribute value field. The attribute type field may be 1 byte, the attribute length field may be 2 bytes, and the attribute value field may be a variable number of bits or bytes. The attribute length field may follow the attribute type field. and the attribute value field may follow the attribute length field.

In a specific implementation, the attribute TLV field may be carried in, for example, a GRE Tunnel Notify packet. A value of the attribute type may be, for example, 36, which is used to indicate returning of a space usage status of the bonding tunnel reorder buffer. Content carried in the attribute value is described above, and details are not described again.

It should be noted that the GRE data packet or the GRE control packet in this application and the field or format in the GRE data packet or the GRE control packet are merely examples for description, and constitute no limitation on the present disclosure. A person skilled in the art may think of, based on this application, using another packet, or another field or format of the GRE data packet or the GRE control packet to carry the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer in the foregoing implementation. All these belong to this application and are not described herein one by one.

In a specific implementation, the first network device determines the usage status of the buffer space of the bonding tunnel reorder buffer based on the length of the packet queue in the bonding tunnel reorder buffer. For example, if a minimum unit of the buffer space is one byte, and the length of the packet queue in the bonding tunnel reorder buffer is 1518 bytes, the size of the buffer space that has been used in the bonding tunnel reorder buffer is 1518 bytes. The size of the available buffer space in the bonding tunnel reorder buffer can be obtained after the length of the existing packet queue is subtracted from a maximum buffer queue length configured for the bonding tunnel reorder buffer. In this case, a specified quantity of bytes may be used as a specified threshold serving as a basis for further load sharing. Optionally, in the acknowledgment response, the length of the packet queue in the bonding tunnel reorder buffer may be directly returned, that is, the size of the buffer space that has been used in the bonding tunnel reorder buffer is returned. After receiving the acknowledgment response, the first network device may directly use, as a basis for determining a further load sharing policy, the size of the buffer space that has been used in the bonding tunnel reorder buffer. Alternatively, after receiving the acknowledgment response, the first network device may obtain the size of the available buffer space in the bonding tunnel reorder buffer based on the size of the buffer space that has been used in the bonding tunnel reorder buffer, and use the size of the available buffer space in the bonding tunnel reorder buffer as a basis for determining a further load sharing policy. Optionally, in the acknowledgment response, the size of the available buffer space in the bonding tunnel reorder buffer may be directly returned, that is, the available length of the packet buffer queue in the bonding tunnel reorder buffer is returned. After receiving the acknowledgment response, the first network device may directly use the size of the available buffer space in the bonding tunnel reorder buffer as a basis for determining a further load sharing policy, or use, as a basis for determining a further load sharing policy, the size of the buffer space that has been used in the bonding tunnel reorder buffer that is obtained by using the size of the available buffer space in the bonding tunnel reorder buffer.

In another specific implementation, the first network device may determine the usage status of the buffer space of the bonding tunnel reorder buffer based on the quantity of buffer slices that have been used or that are available in the bonding tunnel reorder buffer. For example, a minimum unit of the buffer space is one buffer slice, buffer resources in the bonding tunnel reorder buffer are divided into a plurality of slices, and each slice may have a fixed size, for example, 256 bytes. When storing a packet, the bonding tunnel reorder buffer allocates one or more slices to each packet according to a length of each packet. That a size of a single buffer slice is 256 bytes is used as an example. When the length of the packet queue in the bonding tunnel reorder buffer is 1518 bytes, the size of the buffer space that has been used in the bonding tunnel reorder buffer is six buffer slices. Assuming that the buffer space of the bonding tunnel reorder buffer is divided into 20 buffer slices, the size of the available buffer space in the bonding tunnel reorder buffer is 14 buffer slices. In this case, a specified quantity of buffer slices may be used as a specified threshold. Optionally, in the acknowledgment response, the quantity of buffer slices that have been used in the bonding tunnel reorder buffer may be directly returned, that is, the size of the buffer space that has been used in the bonding tunnel reorder buffer is returned. After receiving the acknowledgment response, the first network device may directly use, as a basis for determining a further load sharing policy, the size of the buffer space that has been used in the bonding tunnel reorder buffer. Alternatively, after receiving the acknowledgment response, the first network device may obtain the size of the available buffer space in the bonding tunnel reorder buffer based on the size of the buffer space that has been used in the bonding tunnel reorder buffer, and use the size of the available buffer space in the bonding tunnel reorder buffer as a basis for determining a further load sharing policy. Optionally, in the acknowledgment response, the size of the available buffer space in the bonding tunnel reorder buffer may be directly returned, that is, the quantity of available buffer slices in the bonding tunnel reorder buffer is returned. After receiving the acknowledgment response, the first network device may directly use the size of the available buffer space in the bonding tunnel reorder buffer as a basis for determining a further load sharing policy, or use, as a basis for determining a further load sharing policy, the size of the buffer space that has been used in the bonding tunnel reorder buffer that is obtained by using the size of the available buffer space in the bonding tunnel reorder buffer.

In another specific implementation, the first network device may alternatively determine the usage status of the buffer space of the bonding tunnel reorder buffer based on the quantity of packets in the bonding tunnel reorder buffer. It should be noted that, for example, a minimum unit of the buffer space is one packet, a maximum quantity of packets that can be stored in the bonding tunnel reorder buffer is configured to be S, and a quantity of packets queued in the bonding tunnel reorder buffer is T. In this case, the size of the buffer space that has been used in the bonding tunnel reorder buffer is T packets. In this case, a specified quantity of packets may be used as a specified threshold. S is greater than 1, and T is greater than 0. Optionally, in the acknowledgment response, the quantity of packets in the bonding tunnel reorder buffer may be directly returned, that is, the size of the buffer space that has been used in the bonding tunnel reorder buffer is returned. After receiving the acknowledgment response, the first network device may directly use, as a basis for determining a further load sharing policy, the size of the buffer space that has been used in the bonding tunnel reorder buffer. Alternatively, after receiving the acknowledgment response, the first network device may obtain the size of the available buffer space in the bonding tunnel reorder buffer based on the size of the buffer space that has been used in the bonding tunnel reorder buffer, and use the size of the available buffer space in the bonding tunnel reorder buffer as a basis for determining a further load sharing policy. Optionally, in the acknowledgment response, the size of the available buffer space in the bonding tunnel reorder buffer may be directly returned, that is, a quantity of packets that can be further stored in the bonding tunnel reorder buffer is returned. After receiving the acknowledgment response, the first network device may directly use the size of the available buffer space in the bonding tunnel reorder buffer as a basis for determining a further load sharing policy, or use, as a basis for determining a further load sharing policy, the size of the buffer space that has been used in the bonding tunnel reorder buffer that is obtained by using the size of the available buffer space in the bonding tunnel reorder buffer. In implementations of this application, the "packet in the bonding tunnel reorder buffer" refers to a packet that has not been correctly sorted in the bonding tunnel reorder buffer, and a packet that is already sorted does not count as a packet in the bonding tunnel reorder buffer.

In the foregoing implementations, dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

In the implementation of determining the usage status of the buffer space of the bonding tunnel reorder buffer based on the quantity of packets in the bonding tunnel reorder buffer, in a specific implementation, the quantity of packets in the bonding tunnel reorder buffer may be further determined based on a quantity of packets that have not been correctly sorted in the bonding tunnel reorder buffer, a quantity of packets that have not been correctly sorted in the first tunnel, and a quantity of packets that have not been correctly sorted in the second tunnel. The following specifically describes how to determine the usage status of the bonding tunnel reorder buffer based on a quantity of packets that have not been correctly sorted in each tunnel.

It should be noted that, in each embodiment of this application, after the first network device performs load sharing for a packet and sends the packet, and before the bonding tunnel reorder buffer in the second network device completes correct sorting, the packet may exist in the following locations: a transmission path of a tunnel (indicated herein by using tunnel i for ease of description) in the bonding tunnel, a reorder buffer of tunnel i, and the bonding tunnel reorder buffer. i is a positive integer greater than or equal to 1. Tunnel 1 refers to the first tunnel described in this application; tunnel 2 refers to the second tunnel described in this application; and so on. Details are not described. At any moment, a packet that exists in any one of the foregoing locations is referred to as a "packet that has not been correctly sorted" in the bonding tunnel. A packet that is being transmitted in tunnel i and a packet in the reorder buffer of tunnel i are referred to as "packets that have not been correctly sorted" in tunnel i. A packet in the reorder buffer of tunnel i refers to a packet that has entered the reorder buffer of tunnel i but has not been correctly sorted. For example, for the first tunnel, a sum of a quantity of packets that are being transmitted in the first tunnel and a quantity of packets in a first tunnel reorder buffer is denoted as a quantity of packets that have not been correctly sorted in the first tunnel. A sum of a quantity of packets that are being transmitted in the second tunnel and a quantity of packets in a second tunnel reorder buffer is denoted as a quantity of packets that have not been correctly sorted in the second tunnel. A reorder buffer of the first tunnel is referred to as the first tunnel reorder buffer in this application, and a reorder buffer of the second tunnel is referred to as the second tunnel reorder buffer in this application. The first tunnel reorder buffer is configured to correctly sort packets transmitted through the first tunnel, and a packet that is correctly sorted by using the first tunnel reorder buffer enters the bonding tunnel reorder buffer. Likewise, the second tunnel reorder buffer is configured to correctly sort packets transmitted through the second tunnel, and a packet that is correctly sorted by using the second tunnel reorder buffer enters the bonding tunnel reorder buffer. The bonding tunnel reorder buffer is configured to correctly sort all packets transmitted through the first tunnel and the second tunnel.

In this implementation, the determining the quantity of packets in the bonding tunnel reorder buffer based on a quantity of packets that have not been correctly sorted in the bonding tunnel reorder buffer, a quantity of packets that have not been correctly sorted in the first tunnel, and a quantity of packets that have not been correctly sorted in the second tunnel specifically includes: The first network device determines, based on the acknowledgment response, the quantity $F_1$ of packets that have not been correctly sorted in the first tunnel, the quantity $F_2$ of packets that have not been correctly sorted in the second tunnel, and the quantity $F_B$ of packets that have not been correctly sorted in the bonding tunnel; and then determines the quantity B of packets in the bonding tunnel reorder buffer, where $B=F_B-F_1-F_2$. In a specific implementation, the first network device may directly determine, based on the determined quantity B of packets in the bonding tunnel reorder buffer, the size of the buffer space that has been used in the bonding tunnel reorder buffer, so as to use, as a basis for determining a further load sharing policy, the size of the buffer space that has been used in the bonding tunnel reorder buffer. Alternatively, the first network device may obtain the size of the available buffer space in the bonding tunnel reorder buffer based on the size of the buffer space that has been used in the bonding tunnel reorder buffer, and use the size of the available buffer space in the bonding tunnel reorder buffer as a basis for determining a further load sharing policy.

Specifically, the second network device further includes the foregoing first tunnel reorder buffer and the foregoing second tunnel reorder buffer. That the first network device sends the plurality of data packets to the second network device specifically includes: The first network device sends the first part of the plurality of data packets to the second network device through the first tunnel, and the first network device sends the second part of the plurality of data packets to the second network device through the second tunnel.

The second network device sends a first acknowledgment response to the first network device for the first part of data packets, and the first network device determines, based on the first acknowledgment response, a quantity of packets that have entered the first tunnel reorder buffer and have been correctly sorted, and a quantity of packets that have entered the bonding tunnel reorder buffer and have been correctly sorted. In a specific implementation, the first network device may determine, according to a packet sequence number of a packet that has entered the first tunnel reorder buffer and has been correctly sorted, the quantity of packets that have entered the first tunnel reorder buffer and have been correctly sorted, where the packet sequence number is carried in the first acknowledgment response; and determine, according to a packet sequence number of a packet that has entered the bonding tunnel reorder buffer and has been correctly sorted, the quantity M of packets that have entered the bonding tunnel reorder buffer and have been correctly sorted, where the packet sequence number is carried in the first acknowledgment response. In a specific implementation, the packet sequence number of the packet that has entered the first tunnel reorder buffer and has been correctly sorted may be a packet sequence number of a latest packet, obtained when the first acknowledgment response is being sent or before the first acknowledgment response is sent, that has entered the first tunnel reorder buffer and has been correctly sorted. Likewise, the packet sequence number of the packet that has entered the bonding tunnel reorder buffer and has been correctly sorted may be a packet sequence number of a latest packet, obtained before the first acknowledgment response is sent, that has entered the bonding tunnel reorder buffer and has been correctly sorted. It may be readily understood by a person skilled in the art based on the embodiments of this application that alternatively the first acknowledgment response may directly carry the packet quantity of packets that have entered the first tunnel reorder buffer and have been correctly sorted. In addition, the packet sequence numbers or the quantity of packets that have entered the first tunnel reorder buffer and have been correctly sorted may alternatively be packet sequence numbers or a quantity of latest packets, obtained within a specified time or period, that have entered the first tunnel reorder buffer and have been correctly sorted. Likewise, the foregoing implementations are also applicable to determining the quantity M of packets that have entered the bonding tunnel reorder buffer and have been correctly sorted. The quantity $F_1$ of packets that have not been correctly sorted in the first tunnel may be obtained based on the determined quantity of packets that have entered the first tunnel reorder buffer and have been correctly sorted and with reference to a quantity of the first part of data packets sent by the first network device to the second network device through the first tunnel. Specifically, the quantity $F_1$ of packets that have not been correctly sorted in the first tunnel may be obtained after the quantity of packets that have entered the first tunnel reorder buffer and have been correctly sorted is subtracted from the quantity of the first part of data packets sent by the first network device to the second network device.

Likewise, the second network device sends a second acknowledgment response to the first network device for the second part of data packets, and the first network device determines, based on the second acknowledgment response, a quantity of packets that have entered the second tunnel reorder buffer and have been correctly sorted and a quantity N of packets that have entered the bonding tunnel reorder buffer and have been correctly sorted. A specific implementation is similar to that of determining, by the first network device based on the first acknowledgement response, the quantity of packets that have entered the first tunnel reorder buffer and have been correctly sorted and the quantity M of packets that have entered the bonding tunnel reorder buffer and have been correctly sorted. Details not described herein again. The quantity $F_2$ of packets that have not been correctly sorted in the second tunnel may be obtained based on the determined quantity of packets that have entered the second tunnel reorder buffer and have been correctly sorted and with reference to a quantity of the second part of data packets sent by the first network device to the second network device through the second tunnel. For a specific implementation, refer to the foregoing manner of determining the quantity $F_1$ of packets that have not been correctly sorted in the first tunnel. Details are not described herein again.

The first network device determines, based on a quantity of the plurality of data packets sent by the first network device and a larger value in the quantity M of packets that have entered the bonding tunnel reorder buffer and have been correctly sorted that is carried in the first acknowledgment response and the quantity N of packets that have entered the bonding tunnel reorder buffer and have been correctly sorted that is carried in the second acknowledgment response, the quantity $F_B$ of packets that have not been correctly sorted in the bonding tunnel reorder buffer. Specifically, the quantity $F_B$ of packets that have not been correctly sorted in the bonding tunnel may be obtained after the larger value in the quantity M of packets that have entered the bonding tunnel reorder buffer and have been correctly sorted that is carried in the first acknowledgment response and the quantity N of packets that have entered the bonding tunnel reorder buffer and have been correctly sorted that is carried in the second acknowledgment response is subtracted from the quantity of the plurality of data packets sent by the first network device.

It can be understood that, alternatively, the first network device may obtain, based on the quantity of the plurality of data packets sent by the first network device and the quantity M of packets that have entered the bonding tunnel reorder buffer and have been correctly sorted that is in the first acknowledgment response, a quantity of packets that have not been correctly sorted in the bonding tunnel reorder buffer (for ease of description, herein referred to as a first value of the quantity of packets that have not been correctly sorted in the bonding tunnel reorder buffer); obtain, based on the quantity of the plurality of data packets sent by the first network device and the quantity N of packets that have entered the bonding tunnel reorder buffer and have been correctly sorted that is in the second acknowledgment response, a quantity of packets that have not been correctly sorted in the bonding tunnel reorder buffer (for ease of description, herein referred to as a second value of the quantity of packets that have not been correctly sorted in the bonding tunnel reorder buffer); then compare the first value of the quantity of packets that have not been correctly sorted in the bonding tunnel reorder buffer and the second value of the quantity of packets that have not been correctly sorted in the bonding tunnel reorder buffer; and determine a larger value in the first value and the second value as the quantity $F_B$ of packets that have not been correctly sorted in the bonding tunnel.

The following specifically describes how the first network device determines, according to a packet sequence number of a packet that has entered the first tunnel reorder buffer and has been correctly sorted, the quantity of packets that have entered the first tunnel reorder buffer and have been correctly sorted, where the packet sequence number is carried in the first acknowledgment response; and how the first network device determines, according to a packet sequence number of a packet that has entered the bonding tunnel reorder buffer and has been correctly sorted, the quantity M of packets that have entered the bonding tunnel reorder buffer and have been correctly sorted, where the packet sequence number is carried in the first acknowledgment response.

In a specific implementation, each packet in the first part of data packets includes a bonding tunnel sequence number and a first tunnel sequence number that are of the packet. The first tunnel sequence number is used to indicate a sequence number of each packet in the first part of data packets in the first tunnel, that is, a transmission sequence of each packet in the first part of data packets in the first tunnel. A packet transmitted in the first tunnel may not arrive at the first tunnel reorder buffer according to a transmission sequence indicated by the first tunnel sequence number, and the first tunnel reorder buffer needs to perform sorting according to the first tunnel sequence number of each packet. A packet that has been correctly sorted enters the bonding tunnel reorder buffer from the first tunnel reorder buffer. A bonding tunnel sequence number of each packet in the first part of data packets that is included in the packet is used to indicate a sequence number of the packet in the bonding tunnel, that is, a transmission sequence of the packet in the bonding tunnel. A packet may not arrive at the bonding tunnel reorder buffer according to a transmission sequence indicated by the bonding tunnel sequence number, and the bonding tunnel reorder buffer needs to perform sorting according to the bonding tunnel sequence number of each packet. A packet that has been correctly sorted is sent from the bonding tunnel reorder buffer to another device in the network.

Each packet in the second part of data packets includes a bonding tunnel sequence number and a second tunnel sequence number that are of the packet. Likewise, the second tunnel sequence number is used to indicate a sequence number of each packet in the second part of data packets in the second tunnel, that is, a transmission sequence of each packet in the second part of data packets in the second tunnel. A bonding tunnel sequence number of each packet in the second part of data packets that is included in the packet is used to indicate a sequence number of the packet in the bonding tunnel, that is, a transmission sequence of the packet in the bonding tunnel.

The second network device determines a first tunnel sequence number carried in a packet that has entered the first tunnel reorder buffer and has been correctly sorted, which may be specifically a first tunnel sequence number carried in a latest packet, obtained when the acknowledgement response is being sent or before the acknowledgement response is sent or within a specified time or period, that has entered the first tunnel reorder buffer and has been correctly sorted; add the first tunnel sequence number to the first acknowledgement response as a first tunnel acknowledgement sequence number; and send the first acknowledgement response to the first network device. It should be noted that the first tunnel acknowledgment sequence number herein may be a first tunnel sequence number carried in a latest packet, obtained when the acknowledgement response is being sent or before the acknowledgement response is sent or within a specified time or period, that has entered the first tunnel reorder buffer and has been correctly sorted, or may be a sequence number that has a mapping relationship with the first tunnel sequence number. For details, refer to the following example for description.

Likewise, the second network device determines a bonding tunnel sequence number carried in a packet that has entered the bonding tunnel reorder buffer and has been correctly sorted, which may be specifically a bonding tunnel sequence number carried in a latest packet, obtained when the acknowledgement response is being sent or before the acknowledgement response is sent or within a specified time or period, that has entered the bonding tunnel reorder buffer and has been correctly sorted; adds the bonding tunnel sequence number to the first acknowledgement response; and sends the first acknowledgement response to the first network device. For ease of description, in this embodiment of this application, a bonding tunnel sequence number, carried in the first acknowledgement response, carried in a latest packet that has entered the bonding tunnel reorder buffer and has been correctly sorted is referred to as a bonding tunnel acknowledgement sequence number.

The first network device may determine, according to the first tunnel acknowledgment sequence number in the first acknowledgment response, a quantity of packets that have entered the first tunnel reorder buffer and have been correctly sorted. In a specific implementation, the quantity of packets that have entered the first tunnel reorder buffer and have been correctly sorted may be obtained after the first tunnel acknowledgment sequence number carried in the first acknowledgment response is subtracted from a largest first tunnel sequence number of the first part of data packets sent by the first network device to the second network device.

Likewise, the first network device may determine, according to the bonding tunnel acknowledgment sequence number in the first acknowledgment response, a quantity of packets that have entered the bonding tunnel reorder buffer and have been correctly sorted. In a specific implementation, the quantity of packets that have entered the bonding tunnel reorder buffer and have been correctly sorted may be obtained after the bonding tunnel acknowledgment sequence number in the first acknowledgment response is subtracted from a largest bonding tunnel sequence number of the plurality of data packets sent by the first network device to the second network device.

The second network device determines a second tunnel sequence number carried in a packet that has entered the bonding tunnel reorder buffer and has been correctly sorted, which may be specifically a second tunnel sequence number carried in a latest packet, obtained when the acknowledgement response is being sent or before the acknowledgement response is sent or within a specified time or period, that has entered the second tunnel reorder buffer and has been correctly sorted; adds the second tunnel sequence number to the second acknowledgement response; and sends the second acknowledgement response to the first network device. For ease of description, in this embodiment of this application, a second tunnel sequence number, carried in the second acknowledgement response, carried in a latest packet that has entered the second tunnel reorder buffer and has been correctly sorted is referred to as a second tunnel acknowledgement sequence number.

Likewise, the second network device determines a bonding tunnel sequence number carried in a packet that has entered the bonding tunnel reorder buffer and has been correctly sorted, which may be specifically a bonding tunnel sequence number carried in a latest packet, obtained when the acknowledgement response is being sent or before the acknowledgement response is sent or within a specified time or period, that has entered the bonding tunnel reorder buffer and has been correctly sorted; adds the bonding tunnel sequence number to the second acknowledgement response; and sends the second acknowledgement response to the first network device. For ease of description, in this embodiment of this application, a bonding tunnel sequence number, carried in the second acknowledgement response, carried in a latest packet that has entered the bonding tunnel reorder buffer and has been correctly sorted is referred to as a bonding tunnel acknowledgement sequence number.

The first network device may determine, according to the second tunnel acknowledgment sequence number in the second acknowledgment response, a quantity of packets that have entered the second tunnel reorder buffer and have been correctly sorted. In a specific implementation, the quantity of packets that have entered the second tunnel reorder buffer and have been correctly sorted may be obtained after the second tunnel acknowledgment sequence number carried in the second acknowledgment response is subtracted from a largest second tunnel sequence number of the second part of data packets sent by the first network device to the second network device.

Likewise, the first network device may determine, according to the bonding tunnel acknowledgment sequence number in the second acknowledgment response, a quantity of packets that have entered the bonding tunnel reorder buffer and have been correctly sorted. In a specific implementation, the quantity of packets that have entered the bonding tunnel reorder buffer and have been correctly sorted may be obtained after the bonding tunnel acknowledgment sequence number in the second acknowledgment response is subtracted from a largest bonding tunnel sequence number of the plurality of data packets sent by the first network device to the second network device.

The following specifically describes a mapping relationship between a single tunnel sequence number and a single-tunnel acknowledgement sequence number, and a mapping relationship between a bonding tunnel sequence number and a bonding tunnel acknowledgement sequence number. In this embodiment of this application, when the single tunnel is the first tunnel, the single tunnel sequence number represents a first tunnel sequence number. When the single tunnel is the second tunnel, the single tunnel sequence number represents a second tunnel sequence number. The second network device may store a mapping relationship table. The mapping relationship table is used to store a mapping relationship between a first tunnel acknowledgement sequence number and a first tunnel sequence number, a mapping relationship between a second tunnel acknowledgement sequence number and a second tunnel sequence number, and a mapping relationship between a bonding tunnel acknowledgement sequence number and a bonding tunnel sequence number. Correspondingly, the first network device also stores the mapping relationships. For example, the mapping relationship may be established in the following manner: The first tunnel sequence number is an Arabic number 1, and the first tunnel acknowledgement sequence number is a letter A mapped to the number 1. It should be noted that the foregoing manner of establishing the mapping relationship is merely an example, and the mapping relationship may be specifically established in a plurality of different manners. Any means that can be figured out by a person skilled in the art for establishing such a correspondence is covered in a mapping rule in this embodiment of this application. A specific form of the mapping relationship table may be implemented in a plurality of different manners. The correspondence may be expressed in a form of a table, or in another manner. This is not limited in this application.

It should be noted that, in the foregoing implementation, each packet in the plurality of data packets sent by the first network device to the second network device includes two sequence numbers, that is, a bonding tunnel sequence number and a first tunnel sequence number of the packet. In another specific implementation, each packet may include only a bonding tunnel sequence number and include no tunnel sequence number of each single tunnel. In this case, the second network device may obtain a bonding tunnel sequence number carried in a latest packet, obtained when the acknowledgement response is being sent or before the acknowledgement response is sent or within a specified time or period, that has entered the first tunnel reorder buffer and has been correctly sorted; add the bonding tunnel sequence number to the first acknowledgment response; and send the first acknowledgment response to the first network device. The first network device determines, according to the bonding tunnel sequence number in the first acknowledgment response and a bonding tunnel sequence number of each data packet in the first part of data packets sent by the first network device to the second network device, the quantity of packets that have entered the first tunnel reorder buffer and have been correctly sorted. Likewise, the first network device determines, according to the bonding tunnel sequence number in the second acknowledgment response and a bonding tunnel sequence number of each data packet in the second part of data packets sent by the first network device to the second network device, the quantity of packets that have entered the second tunnel reorder buffer and have been correctly sorted.

In a specific implementation, each packet in the first part of data packets includes a sequence number field used to carry the first tunnel sequence number and a bonding sequence number field used to carry the bonding tunnel sequence number. Each packet in the second part of data packets includes a sequence number field used to carry the second tunnel sequence number and a bonding sequence number field used to carry the bonding tunnel sequence number. In a specific implementation, the sequence number field and the bonding sequence number field are carried by using a GRE data packet. For example, the sequence number field and the bonding sequence number field may be carried in a GRE packet header. The sequence number field and the bonding sequence number field may be, for example, 32 bits.

The first acknowledgment response includes an acknowledgment number field and a bonding acknowledgment number field, the acknowledgment number field is used to carry the first tunnel acknowledgment sequence number, and the bonding acknowledgment number field is used to carry the bonding tunnel acknowledgment sequence number.

In a specific implementation, the first acknowledgement response is a GRE data packet, and the acknowledgment number field and the bonding acknowledgment number field are carried by using the GRE data packet. For example, the acknowledgment number field and the bonding acknowledgment number field may be carried in a packet header of the GRE data packet. The acknowledgment number field and the bonding acknowledgment number field may be, for example, 32 bits.

In another specific implementation, the first acknowledgment response is a GRE control packet, and an attribute TLV field included in the GRE control packet is used to carry the first tunnel acknowledgment sequence number and the bonding tunnel acknowledgment sequence number. An encapsulation format of the attribute TLV field in the GRE control packet is as follows: an attribute type field, an attribute length field, and an attribute value field. The attribute type field may be 1 byte, the attribute length field may be 2 bytes, and the attribute value field may be a variable number of bits or bytes. The attribute length field may follow the attribute type field. and the attribute value field may follow the attribute length field.

In a specific implementation, the attribute TLV field may be carried in a GRE Tunnel Notify packet. A value of the attribute type may be, for example, 37, and the attribute value includes the first bonding tunnel acknowledgement sequence number and the bonding tunnel acknowledgement sequence number.

In a specific implementation, a format of the attribute TLV field in the GRE control packet may be as follows: an attribute type field, an attribute length field. a bonding acknowledgment number field. and an acknowledgment number field. The attribute type field may be 1 byte, the attribute length field may be 2 bytes, the bonding acknowledgment number field may be 4 bytes, and the acknowledgment number field may be 4 bytes. The attribute length field may follow the attribute type field, the bonding acknowledgment number field may follow the attribute length field, and the acknowledgment number field may follow the bonding, acknowledgment number field.

The second acknowledgment response includes an acknowledgment number field and a bonding acknowledgment number field, the acknowledgment number field is used to carry the second tunnel acknowledgment sequence number, and the bonding acknowledgment number field is used to carry the bonding tunnel acknowledgment sequence number. In a specific implementation, the second acknowledgement response is a GRE data packet, and the acknowledgment number field and the bonding acknowledgment number field are carried by using the GRE data packet. For example, the acknowledgment number field and the bonding acknowledgment number field may be carried in a packet header of the GRE data packet. The acknowledgment number field and the bonding acknowledgment number field may be, for example, 32 bits.

In another specific implementation, the second acknowledgment response is a GRE control packet, and an attribute TLV field included in the GRE control packet is used to carry the second tunnel acknowledgment sequence number and the bonding tunnel acknowledgment sequence number. For an encapsulation format of the attribute TLV field in the second acknowledgement response, refer to the foregoing description of the first acknowledgement response. Details are not described herein again.

In the foregoing solution provided in this application, for the sequence number field, the bonding sequence number field, the acknowledgment number field, and the bonding acknowledgment number field that are carried by using a GRE data packet, or the attribute TLV field carried in a GRE control packet, there is no need to extend an existing protocol, and the quantity of packets in the bonding tunnel reorder buffer can be determined based on content carried in the foregoing fields.

It should be noted that the GRE data packet or the GRE control packet and the field or format in the GRE data packet or the GRE control packet are merely examples for description, and constitute no limitation on the present disclosure. A person skilled in the art may think of, based on this application, using another packet, or another field or format of the GRE data packet or the GRE control packet to carry the first tunnel sequence number, the first tunnel acknowledgement sequence number, the bonding tunnel sequence number, the second tunnel sequence number, the second tunnel acknowledgement sequence number, and the bonding tunnel acknowledgement sequence number in the foregoing implementation.

Figure 4:
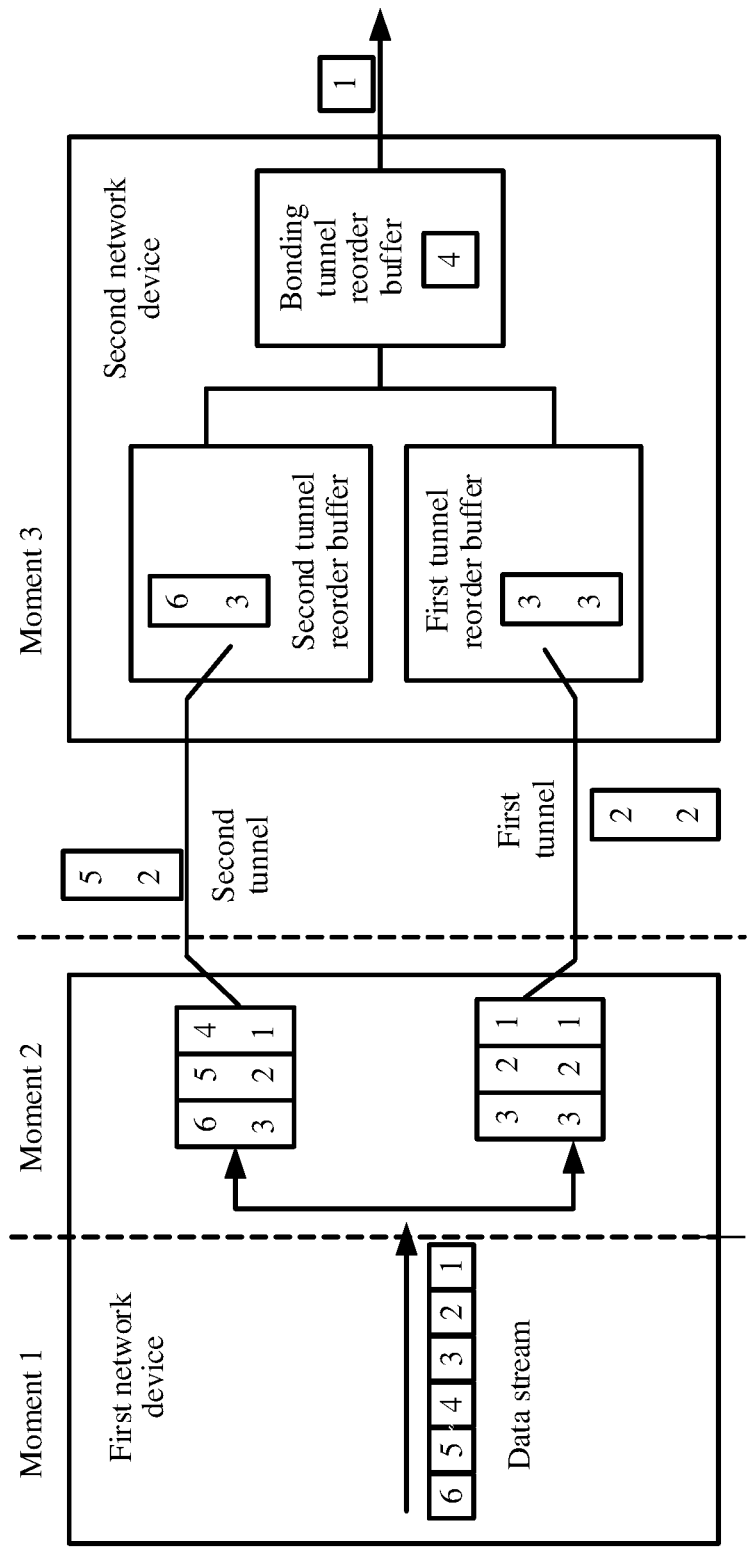
FIG. 4 is a schematic diagram of calculation of a quantity of packets in a bonding tunnel reorder buffer according to an embodiment of this application.

With reference to FIG. 4, the following describes, by using an example, a method for determining the size of the buffer space that has been used in the bonding tunnel reorder buffer based on the quantity of packets that have not been correctly sorted in the bonding tunnel reorder buffer, the quantity of packets that have not been correctly sorted in the first tunnel, and the quantity of packets that have not been correctly sorted in the second tunnel in this application.

At moment 1, the first network device receives six packets. The first network device sends the six data packets to the second network device, where each data packet carries a bonding tunnel sequence number based on the bonding tunnel. As shown in FIG. 4, a bonding tunnel sequence number of a first data packet is 1; a bonding tunnel sequence number of a second data packet is 2; and so on. A bonding tunnel sequence number of a sixth data packet is 6. The six packets are respectively referred to as a packet 1, a packet 2, a packet 3, a packet 4, a packet 5, and a packet 6.

At moment 2, according to a specified load sharing policy, for example, according to a token bucket mechanism, the packet 1 to the packet 3 are allocated to the first tunnel for transmission, and the packet 4 to the packet 6 are transmitted through the second tunnel. Then, the first network device allocates a first tunnel sequence number based on the first tunnel to each of the packet 1 to the packet 3, and the first tunnel sequence numbers of the three packets are respectively 1, 2, and 3. The first network device allocates a second tunnel sequence number based on the second tunnel to each of the packet 4 to the packet 6, and the second tunnel sequence numbers of the three packets are respectively 1, 2, and 3.

When sending the foregoing packets through the first tunnel and the second tunnel, the first network device records a first tunnel sequence number, a second tunnel sequence number, and a bonding tunnel sequence number. The first network device may store the foregoing information in a form of a table, or may store the foregoing information in another form, and a storing form is not limited.

With reference to FIG. 4, the first network device first sends the packet 1 through the first tunnel, and records the first tunnel sequence number and the bonding tunnel sequence number of the packet 1. In other words, after the packet 1 is sent, the recorded first tunnel sequence number is 1, and the recorded bonding tunnel sequence number is 1. Then the first network device sends the packet 2 through the first tunnel, and records the first tunnel sequence number and the bonding tunnel sequence number of the packet 2. In other words, after the packet 2 is sent, the recorded first tunnel sequence number is 2, and the recorded bonding tunnel sequence number is 2. By analogy, when the first network device sends the packet 6 through the second tunnel, a recording result of the first network device is: The first tunnel sequence number is 3, the second tunnel sequence number is 3, and the bonding tunnel sequence number is 6.

In this example, when sending a packet to the second network device, the first network device records a single tunnel sequence number and a bonding tunnel sequence number that are corresponding to the packet. In a specific implementation, the first network device may store a list for recording a single tunnel sequence number and a bonding tunnel sequence number that are corresponding to a packet, and each entry is used to record a first tunnel sequence number, a second tunnel sequence number, and a bonding tunnel sequence number. In a specific implementation, the first network device may alternatively store two lists, where one list is used to record a correspondence between a first tunnel sequence number and a bonding tunnel sequence number, and the other list is used to record a correspondence between a second tunnel sequence number and a bonding tunnel sequence number. This application sets no specific limitation on a form in which the first network device stores a single tunnel sequence number and a bonding tunnel sequence number that are corresponding to a packet. A single tunnel sequence number of a packet sent through the first tunnel is a first tunnel sequence number, and a single tunnel sequence number of a packet sent through the second tunnel is a second tunnel sequence number.

In a specific implementation, when sending a current packet, the first network device may choose to directly update a previous entry record, to obtain an entry record corresponding to the currently sent packet. With reference to FIG. 4, when the first network device sends the packet 1, an entry record is that the first tunnel sequence number is 1 and the bonding tunnel sequence number is 1. When the packet 2 is sent, the entry record obtained when the packet 1 is sent is a previous entry record. The first network device directly updates the first tunnel sequence number to 2, and directly updates the bonding tunnel sequence number to 2. Optionally, the first network device may create a new entry to record a single tunnel sequence number and a bonding tunnel sequence number that are corresponding to the current packet, and delete the previous entry record. Optionally, the first network device may alternatively create a new entry to record a single tunnel sequence number and a bonding tunnel sequence number that are corresponding to the current packet, and retain the previous entry record or automatically age the previous entry record after a specific aging time expires. This is not limited in this application.

At moment 3, the second network device receives the six packets sent by the first network device. In a transmission process, a packet probably needs to be routed and forwarded for a plurality of times. If congestion or a packet loss occurs on any router, packet disorder occurs; or during transmission, a physical signal of a packet is interfered, and a packet loss or packet disorder may occur. For the foregoing possible reasons, in the first tunnel, the packet 1 and the packet 3 first arrive at the second network device, and the packet 2 is still on a transmission path of the first tunnel. Likewise, in the second tunnel, the packet 4 and the packet 6 first arrive at the second network device, and the packet 5 is still on a transmission path of the second tunnel.

Therefore, with reference to FIG. 4, at moment 3, the second network device receives the packet 1 and the packet 3 through the first tunnel. Because the first tunnel sequence number carried in the packet 1 is 1, it is considered that the packet 1 has been correctly sorted in the first tunnel reorder buffer, and the packet 1 enters the bonding tunnel reorder buffer from the first tunnel reorder buffer, and is output from the bonding tunnel reorder buffer to another network device. The packet 3 arrives at the first tunnel reorder buffer before the packet 2. Therefore, the packet 3 can enter the bonding tunnel reorder buffer only after the packet 2 arrives at the first tunnel reorder buffer and is correctly sorted. The second network device receives the packet 4 and the packet 6 through the second tunnel. The second tunnel sequence number carried in the packet 4 is 1, and therefore it is considered that the packet 4 has been correctly sorted in the second tunnel reorder buffer, and enters the bonding tunnel reorder buffer. The packet 4 arrives at the bonding tunnel reorder buffer before the packet 2 and the packet 3. Therefore, the packet 4 can be correctly sorted only after the packet 2 and the packet 3 arrive at the bonding tunnel reorder buffer.

Therefore, in this example, in the first acknowledgment response returned by the second network device to the first network device, the first tunnel sequence number 1 of the packet 1 that has been correctly sorted is used as the first tunnel acknowledgment sequence number and returned to the first network device, and a bonding tunnel sequence number carried in a packet that currently enters the bonding tunnel reorder buffer and has been correctly sorted is used as the bonding tunnel acknowledgment sequence number and returned to the first network device. In the second acknowledgment response returned by the second network device to the first network device, the second tunnel sequence number of the packet 4 that has been correctly sorted is used as the second tunnel acknowledgment sequence number and returned to the first network device, and a bonding tunnel sequence number carried in a packet that currently enters the bonding tunnel reorder buffer and has been correctly sorted is used as the bonding tunnel acknowledgment sequence number and returned to the first network device. At moment 3, only the packet 1 has been correctly sorted in the bonding tunnel reorder buffer. Therefore, in both the first acknowledgment response and the second acknowledgment response that are returned by the second network device to the first network device, the bonding tunnel sequence number of the packet 1 is used as the bonding tunnel acknowledgment sequence number and returned to the first network device.

In the scenario in FIG. 4, a quantity of packets sent by the first network device through the first tunnel is 3, and a first tunnel sequence number, recorded by the first network device, of a latest packet that is sent before the first acknowledgement response is received is 3; and the first network device determines, according to the received first acknowledgment response, that the first tunnel acknowledgment sequence number is 1. A quantity of packets sent by the first network device through the second tunnel is 3, and a second tunnel sequence number, recorded by the first network device, of a latest packet that is sent before the second acknowledgement response is received is 3; and the first network device determines, according to the received second acknowledgment response, that the second tunnel acknowledgment sequence number is 1. A total quantity of packets in the bonding tunnel that are sent by the first network device is 6, and a recorded bonding tunnel sequence number is 6. It is determined, according to the first acknowledgment response and the second acknowledgment response, that a maximum value of the returned bonding tunnel acknowledgment sequence numbers is 1. Therefore, it can be obtained through calculation that the quantity of packets that have not been correctly sorted in the first tunnel is $F_1=3-1=2$, the quantity of packets that have not been correctly sorted in the second tunnel is $F_2=3-1=2$, and the quantity of packets that have not been correctly sorted in the bonding tunnel is $F_B=6-1=5$. Therefore, the quantity of packets in the bonding tunnel reorder buffer is $B=F_B-F_1-F_2=5-2-2=1$. As can be learned from FIG. 4, currently, only the packet 4 exists in the bonding tunnel reorder buffer. In this example, moment 1, moment 2, and moment 3 may refer to time ranges, or may refer to specific moments.

The following describes in detail how to specifically perform, based on the usage status of the buffer space of the bonding tunnel reorder buffer and according to the specified load sharing policy, load sharing between the first tunnel and the second tunnel for a packet to be transmitted by the first network device to the second network device in S107. The specified load sharing policy may specifically include a quantity of packets that have not been correctly sorted in each single tunnel, or may include a delay status of each single tunnel, or may be a space usage status of a reorder buffer of each single tunnel, or another load sharing policy figured out by a person skilled in the art after reading this embodiment of this application.

An implementation of performing load sharing based on the quantity of packets that have not been correctly sorted in each single tunnel is described as follows: When the first network device determines that the size of the space that has been used in the bonding tunnel reorder buffer is greater than or equal to a specified first threshold, or the size of the available space of the bonding tunnel reorder buffer is less than or equal to a specified second threshold, the first network device selects a tunnel with a smaller quantity of packets that have not been correctly sorted in the single tunnels, to perform load sharing for a packet to be transmitted by the first network device to the second network device. The single tunnel herein refers to each of the tunnels that compose the bonding tunnel, for example, the first tunnel or the second tunnel in this embodiment.

In a specific implementation, refer to the foregoing specific implementation of determining the quantity of packets that have not been correctly sorted in the first tunnel and the quantity of packets that have not been correctly sorted in the second tunnel, to determine the quantity of packets that have not been correctly sorted in each single tunnel. The following gives a brief description by using an example of determining quantities of packets that have not been correctly sorted in the first tunnel and the second tunnel. The first network device sends the first part of the plurality of data packets to the second network device through the first tunnel, and the first network device sends the second part of the plurality of data packets to the second network device through the second tunnel. Each packet in the first part of data packets includes a first tunnel sequence number of the packet, and the first tunnel sequence number is used to indicate a sequence number of each packet in the first part of data packets in the first tunnel. Each packet in the second part of data packets includes a second tunnel sequence number of the packet, and the second tunnel sequence number is used to indicate a sequence number of each packet in the second part of data packets in the second tunnel. The first network device receives the first acknowledgement response that is for a first data packet in the first part of data packets and that is sent by the second network device. The first network device receives the second acknowledgement response that is for a second data packet in the second part of data packets and that is sent by the second network device. The first acknowledgment response includes a first tunnel acknowledgment sequence number, and the second acknowledgment response includes a second tunnel acknowledgment sequence number. The first network device determines, based on the first tunnel acknowledgement sequence number, the quantity of packets that have entered the first tunnel reorder buffer and have been correctly sorted. The first network device determines, based on the second tunnel acknowledgement sequence number, the quantity of packets that have entered the second tunnel reorder buffer and have been correctly sorted. The first network device obtains, based on a quantity of the first part of data packets sent by the first network device and the quantity of packets that have entered the first tunnel reorder buffer and have been correctly sorted, the quantity of packets that have not been correctly sorted in the first tunnel, where the quantity of packets that have entered the first tunnel reorder buffer and have been correctly sorted is determined based on the first acknowledgment response. The first network device obtains, based on a quantity of the second part of data packets sent by the first network device and the quantity of packets that have entered the second tunnel reorder buffer and have been correctly sorted, the quantity of packets that have not been correctly sorted in the second tunnel, where the quantity of packets that have entered the second tunnel reorder buffer and have been correctly sorted is determined based on the second acknowledgment response.

An implementation of performing load sharing based on a usage status of buffer space of each single-tunnel reorder buffer is specifically described as follows: When the first network device determines that the size of the space that has been used in the bonding tunnel reorder buffer is greater than or equal to a specified first threshold, or the size of the available space of the bonding tunnel reorder buffer is less than or equal to a specified second threshold, the first network device performs, based on the usage statuses of the buffer space of the single-tunnel reorder buffers, load sharing between a plurality of single tunnels for a packet to be transmitted by the first network device to the second network device. The single tunnel herein refers to each of the tunnels that compose the bonding tunnel, for example, the first tunnel or the second tunnel in this embodiment. The single-tunnel reorder buffer refers to a reorder buffer of each of the tunnels that compose the bonding tunnel, for example, the first tunnel reorder buffer or the second tunnel reorder buffer in this embodiment. The usage status of buffer space of a single-tunnel reorder buffer may include, for example, a size of buffer space that has been used in the single-tunnel reorder buffer or a size of available buffer space in the single-tunnel reorder buffer. Specifically, in this embodiment of this application, when the first network device determines that the size of the space that has been used in the bonding tunnel reorder buffer is greater than or equal to a specified first threshold, or the size of the available space of the bonding tunnel reorder buffer is less than or equal to a specified second threshold, the first network device selects a tunnel in which less buffer space has been used in a single-tunnel reorder buffer or a tunnel in which more buffer space is available in a single-tunnel reorder buffer, to perform load sharing for a plurality of consecutive packets subsequently received by the first network device.

In this implementation, the first network device determines a usage status of buffer space of a single-tunnel reorder buffer based on a length of a packet queue in the single-tunnel reorder buffer; or the first network device determines a usage status of buffer space of a single-tunnel reorder buffer based on a quantity of buffer slices that have been used or available in the single-tunnel reorder buffer; or the first network device determines a usage status of buffer space of a single-tunnel reorder buffer based on a quantity of packets in the single-tunnel reorder buffer. For a specific description, refer to the foregoing description of how to determine the usage status of the buffer space of the bonding tunnel reorder buffer. Details are not described herein again.

It should be noted that an acknowledgment response may be returned to the first network device by using the second network device, to determine a usage status of buffer space of a single-tunnel reorder buffer in the foregoing manner. For example, in this embodiment of this application, the first acknowledgment response returned through the first tunnel is used to determine a usage status of buffer space of the first tunnel reorder buffer, and the second acknowledgment response returned through the second tunnel is used to determine a usage status of buffer space of the second tunnel reorder buffer. The acknowledgment response is a GRE data packet, and the GRE data packet includes a reorder buffer size field; and a usage status of buffer space of a single-tunnel reorder buffer is determined based on content carried in the Reorder Buffer Size field. For example, the Reorder Buffer Size field may be carried in a header of the GRE packet. The Reorder Buffer Size field may be, for example, 32 bits. The carried content includes a quantity of packets in the single-tunnel reorder buffer, a length of a packet queue in the single-tunnel reorder buffer, an available length of a packet buffer queue in the single-tunnel reorder buffer, a quantity of buffer slices that have been used in the single-tunnel reorder buffer, or a quantity of available buffer slices in the single-tunnel reorder buffer.

Alternatively, the acknowledgment response is a GRE control packet. The GRE control packet includes an attribute TLV field, and the attribute TLV field includes a type T field, a length L field, and a value V field. The first network device determines the usage status of the buffer space of the bonding tunnel reorder buffer based on content carried in the V field. The attribute TLV field in the GRE control packet is shown above, and details are not described herein again. A value of the attribute type may be, for example, 38, which is used to indicate returning of a space usage status of the single-tunnel reorder buffer. Content carried in the attribute value is described above, and details are not described again.

It should be noted that the GRE data packet or the GRE control packet and the field or format in the GRE data packet or the GRE control packet are merely examples for description, and constitute no limitation on the present disclosure. A person skilled in the art may think of, based on this application, using another packet, or another field or format of the GRE data packet or the GRE control packet to carry the quantity of packets in the single-tunnel reorder buffer, the length of the packet queue in the single-tunnel reorder buffer, the available length of the packet buffer queue in the single-tunnel reorder buffer, the quantity of buffer slices that have been used in the single-tunnel reorder buffer, or the quantity of available buffer slices in the single-tunnel reorder buffer in the foregoing implementation. All these belong to this application and are not described herein one by one.

An implementation of performing load sharing based on a delay status of each single tunnel is specifically described as follows: When the first network device determines that the size of the space that has been used in the bonding tunnel reorder buffer is greater than or equal to a specified first threshold, or the size of the available space of the bonding tunnel reorder buffer is less than or equal to a specified second threshold, the first network device selects a tunnel with a smaller RTT in the single tunnels, to perform load sharing for a packet to be transmitted by the first network device to the second network device. In a specific implementation, the first network device determines a round trip time RTT of the first tunnel according to a time interval between sending a third data packet in the first part of data packets and receiving an acknowledgement response that is for the third data packet and that is sent by the second network device, where a first tunnel sequence number included in the third data packet corresponds to a first tunnel acknowledgment sequence number included in the acknowledgment response for the third data packet. In a specific implementation, the first network device determines a round trip time RTT of the second tunnel according to a time interval between sending a fourth data packet in the second part of data packets and receiving an acknowledgement response that is for the fourth data packet and that is sent by the second network device, where a second tunnel sequence number included in the fourth data packet corresponds to a second tunnel acknowledgment sequence number included in the acknowledgment response for the fourth data packet.

Specifically, when the first network device sends the third data packet through the first tunnel, the third data packet carries the first tunnel sequence number corresponding to the third data packet. After the second network device receives the third data packet, and the third data packet enters the bonding tunnel reorder buffer, the second network device returns an acknowledgment response to the first network device, where the acknowledgment response carries the first tunnel acknowledgment sequence number. After receiving the acknowledgement response sent by the second network device for the third data packet, the first network device calculates a time interval from sending the third data packet to receiving the acknowledgement response, so as to determine the round trip time of the first tunnel. Similarly, the first network device determines the round trip time of the second tunnel based on the same principle.

According to the method for determining a single-tunnel RTT provided in this application, in a dynamic load sharing solution, a single-tunnel RTT can be determined. There is no need to send an additional probe packet to calculate an RTT of a single tunnel, thereby effectively saving network overheads. It should be noted that in addition to the foregoing method for determining an RTT provided in this embodiment of this application, an RTT of a tunnel may be determined by using any existing method in the prior art. For example, an additional probe packet used to detect an RTT is sent. Details are not described in this application.

According to the technical solution provided in this application, after the first network device determines that the size of the buffer space that has been used in the bonding tunnel reorder buffer is greater than or equal to a specified threshold, or after the first network device determines that the size of the available buffer space in the bonding tunnel reorder buffer is less than or equal to a specified threshold, the first network device can perform load sharing for a plurality of consecutive packet sequences that subsequently arrive at the first network device, according to the specified load sharing policy, for example, selecting a tunnel with a smaller RTT to transmit the packet sequences, or selecting a tunnel with a smaller quantity of packets that have not been correctly sorted in the single tunnels to transmit the packet sequences, so that the packet sequences are no longer allocated to a tunnel with a large delay or with a larger quantity of packets in the single tunnel. In this way, it can be effectively avoided that more packets are held up in a congested tunnel, which causes a delay of waiting by packets transmitted through a non-congested tunnel in a reorder buffer and/or a possible traffic overflow in the bonding tunnel reorder buffer, thereby effectively reducing packet losses and system retransmissions.

In this application, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved.

The load sharing method according to the embodiments of this application is described above in detail with reference to FIG. 2 to FIG. 4. The following describes in detail, with reference to FIG. 5 to FIG. 8, a network device and a system that are used for load sharing according to the embodiments of this application.

Figure 5:
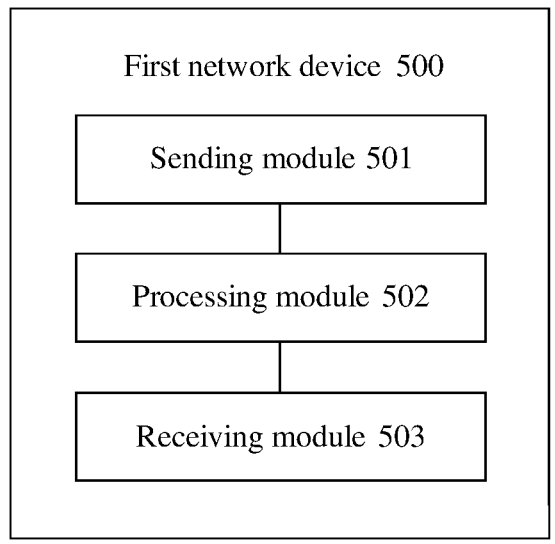
FIG. 5 is a schematic diagram of a first network device according to an embodiment of this application.

FIG. 5 is a schematic diagram of a first network device 500 according to an embodiment of this application. The first network device 500 may be the HAAP device or the HG device in FIG. 2, and may be configured to execute the method shown in FIG. 3. A first tunnel and a second tunnel are established between the first network device 500 and a second network device. The first tunnel and the second tunnel form a bonding tunnel through hybrid bonding. The second network device includes a bonding tunnel reorder buffer, and the bonding tunnel reorder buffer is configured to sort packets entering the bonding tunnel reorder buffer. As shown in FIG. 5, the first network device 500 includes a sending module 501, a receiving module 502, and a processing module 503.

The sending module 501 is configured to send a plurality of data packets to the second network device.

In a specific implementation, the sending module 501 sends the plurality of data packets to the second network device through the first tunnel. In another specific implementation, the sending module 501 sends the plurality of data packets to the second network device through the second tunnel. In another specific implementation, the sending module 501 sends a first part of the plurality of data packets to the second network device through the first tunnel, and the sending module 501 sends a second part of the plurality of data packets to the second network device through the second tunnel.

The receiving module 502 is configured to receive an acknowledgment response sent by the second network device.

Specifically, the acknowledgment response includes information about a usage status of buffer space of the bonding tunnel reorder buffer. The first network device determines the usage status of the buffer space of the bonding tunnel reorder buffer based on the information about the usage status of the buffer space of the bonding tunnel reorder buffer, and performs, based on the usage status of the buffer space of the bonding tunnel reorder buffer and according to a specified load sharing policy, load sharing between the first tunnel and the second tunnel for a packet to be transmitted by the first network device to the second network device.

The processing module 503 is configured to: determine the usage status of the buffer space of the bonding tunnel reorder buffer based on the acknowledgment response, and perform, based on the usage status of the buffer space of the bonding tunnel reorder buffer and according to the specified load sharing policy, load sharing between the first tunnel and the second tunnel for a packet to be transmitted by the first network device to the second network device.

Specifically, the usage status of the buffer space of the bonding tunnel reorder buffer may include, for example, a size of buffer space that has been used in the bonding tunnel reorder buffer or a size of available buffer space in the bonding tunnel reorder buffer. The specified load sharing policy may include, for example, a quantity of packets that have not been correctly sorted in each single tunnel, or may include a delay status of each single tunnel, or may be a space usage status of a reorder buffer of each single tunnel, or another load sharing policy figured out by a person skilled in the art after reading this embodiment of this application.

For how to specifically determine the usage status of the buffer space of the bonding tunnel reorder buffer based on the acknowledgment response, and how to perform, based on the usage status of the buffer space of the bonding tunnel reorder buffer and according to the specified load sharing policy, load sharing between the first tunnel and the second tunnel for a packet to be transmitted by the first network device to the second network device, refer to the following detailed description.

In this application, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved. For example, a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

The following specifically describes how to specifically determine the usage status of the buffer space of the bonding tunnel reorder buffer based on the acknowledgment response.

In a specific implementation provided in this application, when the usage status of the buffer space of the bonding tunnel reorder buffer includes the size of the buffer space that has been used in the bonding tunnel reorder buffer, the size of the buffer space that has been used in the bonding tunnel reorder buffer includes a quantity of packets in the bonding tunnel reorder buffer, a length of a packet queue in the bonding tunnel reorder buffer, or a quantity of buffer slices that have been used in the bonding tunnel reorder buffer. When the usage status of the buffer space of the bonding tunnel reorder buffer includes the size of the available buffer space in the bonding tunnel reorder buffer, the size of the available buffer space in the bonding tunnel reorder buffer includes an available length of a packet buffer queue in the bonding tunnel reorder buffer or a quantity of available buffer slices in the bonding tunnel reorder buffer.

In this implementation, that the receiving module 502 receives the acknowledgement response sent by the second network device specifically includes: The first network device receives the acknowledgment response returned by the second network device through the first tunnel or the second tunnel. The acknowledgment response is a GRE data packet, the GRE data packet includes a bonding reorder buffer size field, and the bonding reorder buffer size field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer. Alternatively, the acknowledgment response is a GRE control packet, the GRE control packet includes an attribute TLV field, the attribute TLV field includes a type T field, a length L field, and a value V field, and the V field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer. The usage status of the buffer space of the bonding tunnel reorder buffer is determined based on the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer. For detailed description of a specific packet format or field format (for example, which fields or extended fields are used), specific content or a specific value of each field, and how to determine the usage status of the buffer space of the bonding tunnel reorder buffer based on the length of the packet queue in the bonding tunnel reorder buffer, the quantity of buffer slices that have been used or that are available in the bonding tunnel reorder buffer, or the quantity of packets in the bonding tunnel reorder buffer, refer to the description of corresponding parts in the foregoing method embodiment. Details are not described herein again.

In the foregoing implementations, dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

In the implementation of determining the usage status of the buffer space of the bonding tunnel reorder buffer based on the quantity of packets in the bonding tunnel reorder buffer, in a specific implementation, the quantity of packets in the bonding tunnel reorder buffer may be further determined based on a quantity of packets that have not been correctly sorted in the bonding tunnel reorder buffer, a quantity of packets that have not been correctly sorted in the first tunnel, and a quantity of packets that have not been correctly sorted in the second tunnel. In this implementation, the processing module 503 determines, based on the acknowledgment response, the quantity $F_1$ of packets that have not been correctly sorted in the first tunnel, the quantity $F_2$ of packets that have not been correctly sorted in the second tunnel, and the quantity $F_B$ of packets that have not been correctly sorted in the bonding tunnel; and then determines the quantity B of packets in the bonding tunnel reorder buffer, where $B=F_B-F_1-F_2$.

Specifically, the second network device further includes a first tunnel reorder buffer and a second tunnel reorder buffer, the first tunnel reorder buffer is configured to sort packets transmitted through the first tunnel, and the second tunnel reorder buffer is configured to sort packets transmitted through the second tunnel.

The sending module 501 sends the first part of the plurality of data packets to the second network device through the first tunnel, where each packet in the first part of data packets includes a bonding tunnel sequence number and a first tunnel sequence number that are of the packet, the first tunnel sequence number is used to indicate a transmission sequence of each packet in the first part of data packets in the first tunnel, and the bonding tunnel sequence number of each packet in the first part of data packets that is included in the packet is used to indicate a transmission sequence of the packet in the bonding tunnel. The sending module 501 sends the second part of the plurality of data packets to the second network device through the second tunnel, where each packet in the second part of data packets includes a bonding tunnel sequence number and a second tunnel sequence number that are of the packet, the second tunnel sequence number is used to indicate a transmission sequence of each packet in the second part of data packets in the second tunnel, and the bonding tunnel sequence number of each packet in the second part of data packets that is included in the packet is used to indicate a transmission sequence of the packet in the bonding tunnel.

The receiving module 502 receives a first acknowledgement response that is for a first data packet in the first part of data packets and that is sent by the second network device, and receives a second acknowledgement response that is for a second data packet in the second part of data packets and that is sent by the second network device. The first acknowledgment response includes the foregoing first tunnel acknowledgment sequence number and bonding tunnel acknowledgment sequence number, and the second acknowledgment response includes the foregoing second tunnel acknowledgment sequence number and bonding tunnel acknowledgment sequence number.

The processing module 503 determines, based on the first acknowledgment response, a quantity of packets that have entered the first tunnel reorder buffer and have been correctly sorted and a quantity M of packets that have entered the bonding tunnel reorder buffer and have been correctly sorted; determines, based on the second acknowledgment response, a quantity of packets that have entered the second tunnel reorder buffer and have been correctly sorted and a quantity N of packets that have entered the bonding tunnel reorder buffer and have been correctly sorted; obtains, based on a quantity of the plurality of data packets sent by the first network device and a larger value in M and N, the quantity $F_B$ of packets that have not been correctly sorted in the bonding tunnel; obtains, based on a quantity of the first part of data packets sent to the second network device and the quantity of packets that have entered the first tunnel reorder buffer and have been correctly sorted, the quantity $F_1$ of packets that have not been correctly sorted in the first tunnel, where the quantity of packets that have entered the first tunnel reorder buffer and have been correctly sorted is determined based on the first acknowledgment response; and obtains, based on a quantity of the second part of data packets sent to the second network device and the quantity of packets that have entered the second tunnel reorder buffer and have been correctly sorted, the quantity $F_2$ of packets that have not been correctly sorted in the second tunnel, where the quantity of packets that have entered the second tunnel reorder buffer and have been correctly sorted is determined based on the second acknowledgment response.

In a specific implementation, the processing module 503 may determine, based on the first tunnel acknowledgment sequence number, the quantity of packets that have entered the first tunnel reorder buffer and have been correctly sorted, and determine, based on the bonding tunnel acknowledgment sequence number included in the first acknowledgment response, the quantity M of packets that have entered the bonding tunnel reorder buffer and have been correctly sorted; and determine, based on the second tunnel acknowledgment sequence number, the quantity of packets that have entered the second tunnel reorder buffer and have been correctly sorted, and determine, based on the bonding tunnel acknowledgment sequence number included in the second acknowledgment response, the quantity N of packets that have entered the bonding tunnel reorder buffer and have been correctly sorted.

In a specific implementation, each packet in the first part of data packets includes a sequence number field used to carry the first tunnel sequence number and a bonding sequence number field used to carry the bonding tunnel sequence number; and each packet in the second part of data packets includes a sequence number field used to carry the second tunnel sequence number and a bonding sequence number field used to carry the bonding tunnel sequence number.

In a specific manner, the first acknowledgment response is a generic routing encapsulation GRE data packet, an acknowledgment number field included in the GRE data packet is used to carry the first tunnel acknowledgment sequence number, and a bonding acknowledgment number field included in the GRE data packet is used to carry the bonding tunnel acknowledgment sequence number. Alternatively, the first acknowledgment response is a GRE control packet, and an attribute TLV field included in the GRE control packet is used to carry the first tunnel acknowledgment sequence number and the bonding tunnel acknowledgment sequence number.

In a specific implementation, the second acknowledgment response is a GRE data packet, an acknowledgment number field included in the GRE data packet is used to carry the second tunnel acknowledgment sequence number, and a bonding acknowledgment number field included in the GRE data packet is used to carry the bonding tunnel acknowledgment sequence number. Alternatively, the second acknowledgment response is a GRE control packet, and an attribute TLV field included in the GRE control packet is used to carry the second tunnel acknowledgment sequence number and the bonding tunnel acknowledgment sequence number.

In the foregoing solution provided in this application, for the sequence number field, the bonding sequence number field, the acknowledgment number field, and the bonding acknowledgment number field that are carried by using a GRE data packet, or the attribute TLV field carried in a GRE control packet, there is no need to extend an existing protocol, and the quantity of packets in the bonding tunnel reorder buffer can be determined based on content carried in the foregoing fields.

It should be noted that, in the implementation of determining the usage status of the buffer space of the bonding tunnel reorder buffer based on the quantity of packets in the bonding tunnel reorder buffer, for more specific description of a specific packet format or field format (for example, which fields or extended fields are used), specific content or a specific value of each field, and how the first network device determines the usage status of the buffer space of the bonding tunnel reorder buffer based on the quantity of packets in the bonding tunnel reorder buffer, refer to the description of corresponding parts in the foregoing method embodiment. Details are not described herein again.

The following specifically describes how to perform, based on the usage status of the buffer space of the bonding tunnel reorder buffer and according to the specified load sharing policy, load sharing between the first tunnel and the second tunnel for a packet to be transmitted by the first network device to the second network device.

In a specific implementation, the specified load sharing policy includes: after the processing module determines that the size of the buffer space that has been used in the bonding tunnel reorder buffer is greater than or equal to a first threshold or the size of the available buffer space in the bonding tunnel reorder buffer is less than or equal to a second threshold, selecting a tunnel with a smaller round trip time RTT in the first tunnel and the second tunnel, or selecting a tunnel with a smaller quantity of packets that have not been correctly sorted in the first tunnel and the second tunnel, to transmit a packet to be sent by the first network device to the second network device. The specified load sharing policy in this application may include a quantity of packets that have not been correctly sorted in each single tunnel, or a delay status of each single tunnel; or may be a space usage status of a reorder buffer of each single tunnel, or another load sharing policy figured out by a person skilled in the art after reading this embodiment of this application. For specific description of an implementation of performing load sharing based on a quantity of packets that have not been correctly sorted in each single tunnel, an implementation of performing load sharing based on a usage status of buffer space of each single-tunnel reorder buffer, and an implementation of performing load sharing based on a delay status of each single tunnel, refer to detailed description of corresponding parts in the foregoing method embodiment. Details are not described herein again.

In the implementation of performing load sharing based on a delay status of each single tunnel, this application provides an implementation of determining a round trip time RTT of a single tunnel, specifically including: The processing module 503 determines a round trip time RTT of the first tunnel according to a time interval between sending a third data packet in the first part of data packets and receiving an acknowledgement response that is for the third data packet and that is sent by the second network device; and the processing module 503 determines a round trip time RTT of the second tunnel according to a time interval between sending a fourth data packet in the second part of data packets and receiving an acknowledgement response that is for the fourth data packet and that is sent by the second network device. For specific description of the implementation of determining a round trip time RTT of a single tunnel, refer to detailed description of a corresponding part in the foregoing method embodiment. Details are not described herein again.

The first network device 500 in this embodiment of this application may be corresponding to the first network device in the load sharing method in the embodiment of this application, and the modules in the network device and the foregoing other operations and/or functions are respectively used to implement corresponding procedures of the method 100 in FIG. 3. For brevity, details are not described herein again.

Figure 6:
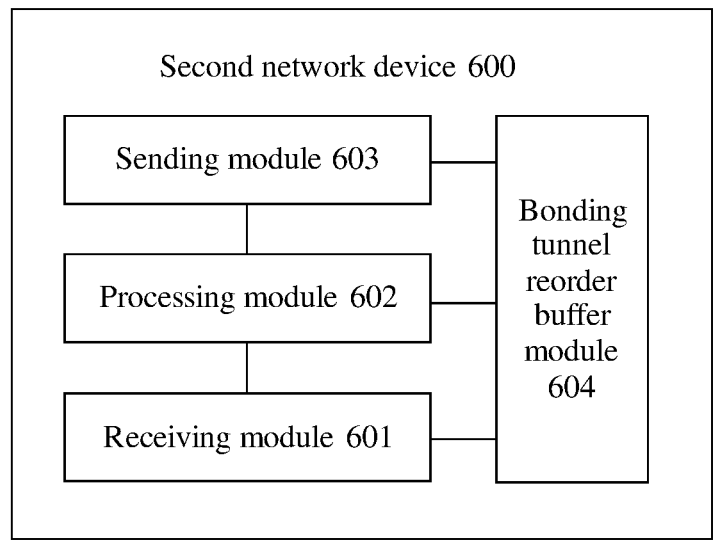
FIG. 6 is a schematic diagram of a second network device according to an embodiment of this application.

FIG. 6 is a schematic diagram of a second network device 600 according to an embodiment of this application. The second network device 600 may be the HG device or the HAAP device in the FIG. 2, and may be configured to execute the method shown in FIG. 3. A first tunnel and a second tunnel are established between the second network device 600 and a first network device, and the first tunnel and the second tunnel form a bonding tunnel through hybrid bonding. The second network device 600 includes a receiving module 601, a processing module 602, a sending module 603, and a bonding tunnel reorder buffer module 604.

The bonding tunnel reorder buffer module 604 is configured to sort packets entering a bonding tunnel reorder buffer.

The receiving module 601 is configured to receive a plurality of data packets sent by the first network device.

In a specific implementation, the second network device receives the plurality of data packets through the first tunnel. In another specific implementation, the second network device receives the plurality of data packets through the second tunnel. In another specific implementation, that the second network device receives the plurality of data packets sent by the first network device specifically includes: The second network device receives a first part of the plurality of data packets sent by the first network device through the first tunnel; and the second network device receives a second part of the plurality of data packets sent by the first network device through the second tunnel.

The processing module 602 is configured to obtain information about a usage status of buffer space of the bonding tunnel reorder buffer included in the second network device, where the bonding tunnel reorder buffer is configured to sort packets entering the bonding tunnel reorder buffer.

Specifically, the usage status of the buffer space of the bonding tunnel reorder buffer may include, for example, a size of buffer space that has been used in the bonding tunnel reorder buffer or a size of available buffer space in the bonding tunnel reorder buffer.

For how to obtain the information about the usage status of the buffer space of the bonding tunnel reorder buffer, refer to the following specific description.

The sending module 603 is configured to send an acknowledgment response to the first network device, where the acknowledgment response includes the information about the usage status of the buffer space of the bonding tunnel reorder buffer. The information is used by the first network device to determine the usage status of the buffer space of the bonding tunnel reorder buffer, and the first network device performs, based on the usage status of the buffer space of the bonding tunnel reorder buffer and according to a specified load sharing policy, load sharing between the first tunnel and the second tunnel for a packet to be transmitted by the first network device to the second network device.

In a specific implementation, each time the second network device 600 receives a packet, the second network device 600 returns an acknowledgment response to the first network device. In another specific implementation, the second network device 600 may set that the second network device 600 periodically returns the acknowledgment response to the first network device at a specific time interval. In another specific implementation, the second network device may alternatively send the acknowledgment response when receiving a request sent by the first network device or when a specified warning state is reached. The specified warning state includes but is not limited to: The size of the buffer space that has been used in the bonding tunnel reorder buffer is greater than or equal to a specified threshold, or the size of the available buffer space in the bonding tunnel reorder buffer is less than or equal to a specified threshold. This is not specifically limited in this application.

Specifically, the specified load sharing policy may include, for example, a quantity of packets that have not been correctly sorted in each single tunnel, or may include a delay status of each single tunnel, or may be a space usage status of a reorder buffer of each single tunnel, or another load sharing policy figured out by a person skilled in the art after reading this embodiment of this application. For example, after the first network device determines that the size of the buffer space that has been used in the bonding tunnel reorder buffer is greater than or equal to a first threshold or the size of the available buffer space in the bonding tunnel reorder buffer is less than or equal to a second threshold, a tunnel with a smaller round trip time RTT in the first tunnel and the second tunnel is selected, or a tunnel with a smaller quantity of packets that have not been correctly sorted in the first tunnel and the second tunnel is selected, to transmit a packet to be sent by the first network device to the second network device.

In the foregoing solution, the usage status of the buffer space of the bonding tunnel reorder buffer is determined based on the acknowledgment response returned by the second network device, and dynamic load sharing is performed, based on the usage status of the buffer space and according to the specified load sharing policy, between the first tunnel and the second tunnel for a packet to be transmitted by the first network device to the second network device, so that transmission efficiency of the bonding tunnel can be effectively improved.

The following specifically describes how to obtain the information about the usage status of the buffer space of the bonding tunnel reorder buffer.

In a specific implementation, when the usage status of the buffer space of the bonding tunnel reorder buffer includes the size of the buffer space that has been used in the bonding tunnel reorder buffer, the information about the usage status of the buffer space of the bonding tunnel reorder buffer includes a quantity of packets in the bonding tunnel reorder buffer, a length of a packet queue in the bonding tunnel reorder buffer, or a quantity of buffer slices that have been used in the bonding tunnel reorder buffer. When the usage status of the buffer space of the bonding tunnel reorder buffer includes the size of the available buffer space in the bonding tunnel reorder buffer, the information about the usage status of the buffer space of the bonding tunnel reorder buffer includes an available length of a packet buffer queue in the bonding tunnel reorder buffer or a quantity of available buffer slices in the bonding tunnel reorder buffer.

In this implementation, that the sending module 603 sends the acknowledgment response to the first network device specifically includes: The second network device sends the acknowledgment response to the first network device through the first tunnel or the second tunnel. In a specific implementation, the acknowledgment response is a GRE data packet, the GRE data packet includes a bonding reorder buffer size field, and the bonding reorder buffer size field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer. In another specific implementation, the acknowledgement response is a GRE control packet, the GRE control packet includes an attribute TLV field, and the attribute TLV field includes a type T field, a length L field, and a value V field. The V field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer. For detailed description of a specific packet format or field format (for example, which fields or extended fields are used), specific content or a specific value of each field, refer to description of corresponding parts in the foregoing method embodiment. Details are not described herein again.

The first network device determines the usage status of the buffer space of the bonding tunnel reorder buffer based on the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer that is included in the acknowledgement response.

In another specific implementation, the information about the usage status of the buffer space of the bonding tunnel reorder buffer includes a single tunnel acknowledgment number and a bonding tunnel acknowledgment sequence number. A single tunnel described in this application refers to each of the tunnels that compose the bonding tunnel, for example, the first tunnel or the second tunnel in this embodiment.

In the implementation of determining the usage status of the buffer space of the bonding tunnel reorder buffer based on the quantity of packets in the bonding tunnel reorder buffer, in a specific implementation, the quantity of packets in the bonding tunnel reorder buffer may be further determined based on a quantity of packets that have not been correctly sorted in the bonding tunnel reorder buffer, a quantity of packets that have not been correctly sorted in the first tunnel, and a quantity of packets that have not been correctly sorted in the second tunnel. In this implementation, the quantity of packets in the bonding tunnel reorder buffer is determined by using the foregoing single-tunnel acknowledgement number and bonding tunnel acknowledgement sequence number.

Specifically, the second network device further includes: a first tunnel reorder buffer module configured to sort packets that are transmitted to the first tunnel reorder buffer through the first tunnel; and a second tunnel reorder buffer module configured to sort packets that are transmitted to the second tunnel reorder buffer through the second tunnel.

The receiving module 601 receives the first part of the plurality of data packets sent by the first network device through the first tunnel, where each packet in the first part of data packets includes a bonding tunnel sequence number and a first tunnel sequence number that are of the packet, the first tunnel sequence number is used to indicate a transmission sequence of each packet in the first part of data packets in the first tunnel, and the bonding tunnel sequence number of each packet in the first part of data packets that is included in the packet is used to indicate a transmission sequence of the packet in the bonding tunnel. The receiving module 601 receives the second part of the plurality of data packets sent by the first network device through the second tunnel, where each packet in the second part of data packets includes a bonding tunnel sequence number and a second tunnel sequence number that are of the packet, the second tunnel sequence number is used to indicate a transmission sequence of each packet in the second part of data packets in the second tunnel, and the bonding tunnel sequence number of each packet in the second part of data packets that is included in the packet is used to indicate a transmission sequence of the packet in the bonding tunnel.

The acknowledgment response includes a first acknowledgment response of the second network device 600 for the first part of data packets and a second acknowledgment response of the second network device 600 for the second part of data packets.

The processing module 602 obtains a first tunnel sequence number in a latest packet, obtained before the first acknowledgment response is sent, that is in the first tunnel reorder buffer in the second network device and that has been correctly sorted, and a bonding tunnel sequence number in a latest packet, obtained before the first acknowledgment response is sent, that is in the bonding tunnel reorder buffer and that has been correctly sorted, and determines a first tunnel acknowledgment sequence number according to the first tunnel sequence number. The processing module 602 determines a bonding tunnel acknowledgement sequence number included in the first acknowledgment response according to the bonding tunnel sequence number in the latest packet, obtained before the first acknowledgment response is sent, that is in the bonding tunnel reorder buffer and that has been correctly sorted. Information about the usage status of the buffer space of the bonding tunnel reorder buffer that is included in the first acknowledgment response includes the first tunnel acknowledgment sequence number and the bonding tunnel acknowledgment sequence number included in the first acknowledgment response.

The processing module 602 obtains a second tunnel sequence number in a latest packet, obtained before the second acknowledgment response is sent, that is in the second tunnel reorder buffer in the second network device and that has been correctly sorted, and a bonding tunnel sequence number in a latest packet, obtained before the second acknowledgment response is sent, that is in the bonding tunnel reorder buffer and that has been correctly sorted, and determines a second tunnel acknowledgment sequence number according to the second tunnel sequence number. The processing module 602 determines a bonding tunnel acknowledgement sequence number included in the second acknowledgment response according to the bonding tunnel sequence number in the latest packet, obtained before the second acknowledgment response is sent, that is in the bonding tunnel reorder buffer and that has been correctly sorted. Information about the usage status of the buffer space of the bonding tunnel reorder buffer that is included in the second acknowledgment response includes the second tunnel acknowledgment sequence number and the bonding tunnel acknowledgment sequence number included in the second acknowledgment response. The first tunnel acknowledgment sequence number, the second tunnel acknowledgment sequence number, the bonding tunnel acknowledgment sequence number included in the first acknowledgment response, and the bonding tunnel acknowledgment sequence number included in the second acknowledgment response are used by the first network device to determine the quantity of packets in the bonding tunnel reorder buffer, and the first network device determines the usage status of the buffer space of the bonding tunnel reorder buffer based on the quantity of packets in the bonding tunnel reorder buffer.

In a specific implementation, the first acknowledgment response is a GRE data packet, an acknowledgment number field included in the GRE data packet is used to carry the first tunnel acknowledgment sequence number, and a bonding acknowledgment number field included in the GRE data packet is used to carry the bonding tunnel acknowledgment sequence number.

In another specific implementation, the first acknowledgment response is a GRE control packet, and an attribute TLV field included in the GRE control packet is used to carry the first tunnel acknowledgment sequence number and the bonding tunnel acknowledgment sequence number.

In a specific implementation, the second acknowledgment response is a GRE data packet, an acknowledgment number field included in the GRE data packet is used to carry the second tunnel acknowledgment sequence number, and a bonding acknowledgment number field included in the GRE data packet is used to carry the bonding tunnel acknowledgment sequence number.

In another specific implementation, the second acknowledgment response is a GRE control packet, and an attribute TLV field included in the GRE control packet is used to carry the second tunnel acknowledgment sequence number and the bonding tunnel acknowledgment sequence number.

For detailed description of a specific packet format or field format (for example, which fields or extended fields are used), specific content or a specific value of each field, refer to description of corresponding parts in the foregoing method embodiment. Details are not described herein again.

In the foregoing implementations, dynamic load sharing is performed, based on the size of the buffer space that has been used in the bonding tunnel reorder buffer or the size of the available buffer space in the bonding tunnel reorder buffer, between the first tunnel and the second tunnel for a packet to be transmitted by the first network device to the second network device, so that a network delay of the bonding tunnel can be effectively reduced, and/or problems such as a packet loss and triggering of application layer retransmission that are caused by a traffic overflow in the bonding tunnel reorder buffer due to network congestion can be greatly alleviated.

The second network device 600 in this embodiment of this application may be corresponding to the second network device in the load sharing method in the embodiment of this application, and the modules in the network device and the foregoing other operations and/or functions are respectively used to implement corresponding procedures of the method 100 in FIG. 3. For brevity, details are not described herein again.

For the first network device 500 and the second network device 600 provided in the foregoing embodiments in this application, the division of the foregoing functional modules is merely used as an example for description. In practical application, the functions may be allocated, based on requirements, to different functional modules to complete, that is, an internal structure of the device is divided into different functional modules to complete all or some of the functions described above.

Figure 7:
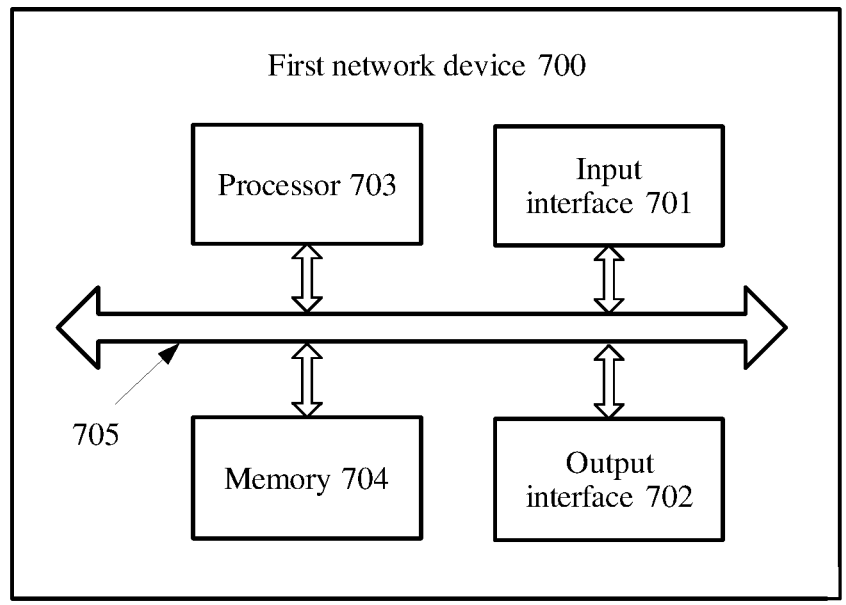
FIG. 7 is a schematic diagram of a hardware structure of a first network device according to an embodiment of this application.

FIG. 7 is another schematic diagram of a first network device 700 according to an embodiment of this application. The first network device 700 may be the HAAP device or the HG device in FIG. 2, and may be configured to execute the method shown in FIG. 3. A first tunnel and a second tunnel are established between the first network device 700 and a second network device. The first tunnel and the second tunnel form a bonding tunnel through hybrid bonding. The second network device includes a bonding tunnel reorder buffer, and the bonding tunnel reorder buffer is configured to sort packets entering the bonding tunnel reorder buffer. As shown in FIG. 7, the first network device 700 includes an input interface 701, an output interface 702, a processor 703, and a memory 704. The input interface 701, the output interface 702, the processor 703, and the memory 704 may be connected by using a bus system 705.

The memory 704 is configured to store a program, an instruction, or code. The processor 703 is configured to execute the program, the instruction, or the code in the memory 704, so as to control the input interface 701 to receive a signal, control the output interface 702 to send a signal, and implement the steps and functions implemented by the first network device in the implementation corresponding to FIG. 3. Details are not described herein again.

In a specific implementation, the output interface 702 is configured to send a plurality of data packets to the second network device; the input interface 701 is configured to receive an acknowledgment response sent by the second network device; and the processor 703 is configured to: determine a usage status of buffer space of the bonding tunnel reorder buffer based on the acknowledgment response, and perform, based on the usage status of the buffer space of the bonding tunnel reorder buffer and according to a specified load sharing policy, load sharing between the first tunnel and the second tunnel for a packet to be transmitted by the first network device to the second network device. For specific implementations of the output interface 702, the input interface 701, and the processor 703, refer to corresponding specific description of the receiving module 502, the sending module 501, and the processing module 503 in the foregoing implementation of FIG. 5. Details are not described herein again.

Figure 8:
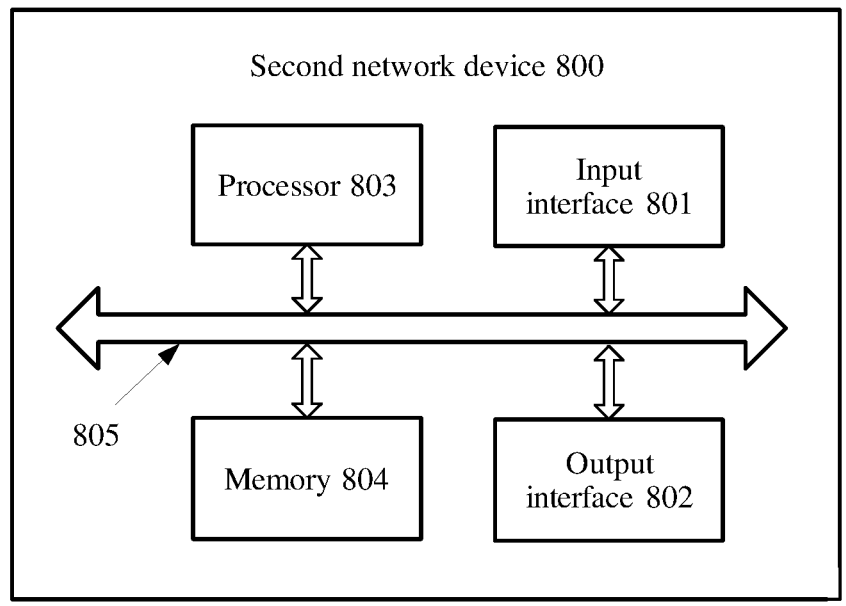
FIG. 8 is a schematic diagram of a hardware structure of a second network device according to an embodiment of this application.

FIG. 8 is another schematic diagram of a second network device 800 according to an embodiment of this application. The second network device 800 may be the HG device or the HAAP device in the figure, and may be configured to execute the method 100 shown in FIG. 3. A first tunnel and a second tunnel are established between the second network device 800 and a first network device, and the first tunnel and the second tunnel form a bonding tunnel through hybrid bonding. As shown in FIG. 8, the second network device 800 includes an input interface 801, an output interface 802, a processor 803, and a memory 804. The input interface 801, the output interface 802, the processor 803, and the memory 804 may be connected by using a bus system 805.

The memory 804 is configured to store a program, an instruction, or code. The processor 803 is configured to execute the program, the instruction, or the code in the memory 804, so as to control the input interface 801 to receive a signal, control the output interface 802 to send a signal, and implement the steps and functions implemented by the second network device in the implementation corresponding to FIG. 3. Details are not described herein again.

In a specific implementation, the memory 804 includes a bonding tunnel reorder buffer configured to sort packets entering the bonding tunnel reorder buffer; the input interface 801 is configured to receive a plurality of data packets sent by the first network device; the processor 803 is configured to obtain information about a usage status of buffer space of the bonding tunnel reorder buffer; and the output interface 802 is configured to send an acknowledgment response to the first network device, where the acknowledgment response includes the information about the usage status of the buffer space of the bonding tunnel reorder buffer. The information is used by the first network device to determine the usage status of the buffer space of the bonding tunnel reorder buffer, and the first network device performs, based on the usage status of the buffer space of the bonding tunnel reorder buffer and according to a specified load sharing policy, load sharing between the first tunnel and the second tunnel for a packet to be transmitted by the first network device to the second network device. In another specific implementation, the memory 804 may further include a first tunnel reorder buffer configured to sort packets entering the first tunnel reorder buffer, and the memory 804 may further include a second tunnel reorder buffer configured to sort packets entering the second tunnel reorder buffer. For specific implementations of the memory 804, the output interface 802, the input interface 801, and the processor 803, refer to corresponding specific description of the bonding tunnel reorder buffer module 604, the sending module 603, the receiving module 601, and the processing module 602 in the foregoing implementation of FIG. 6. Details are not described herein again.

It should be understood that in the embodiment of this application, the processor 703 or processor 803 may be a central processing unit (CPU), or may be another general purpose processor, a digital signal processor (DSP), an application-specific integrated circuit (ASIC), a field-programmable gate array (FPGA), or another programmable logic device, discrete gate or transistor logic device, discrete hardware component, or the like. The general purpose processor may be a microprocessor, or the processor may be any conventional processor or the like.

The memory 704 and the memory 804 may include a read-only memory and a random access memory, and respectively provide an instruction and data to the processor 703 and the processor 803. A part of the memory 704 or the memory 804 may further include a nonvolatile random access memory. For example, the memory 704 or the memory 804 may further store information about a device type.

The bus system 705 or bus system 805 may further include a power bus, a control bus, a status signal bus, and the like, in addition to a data bus. However, for clear description, various types of buses in the figure are marked as the bus system.

In an implementation process, steps in the foregoing method 100 can be implemented by using a hardware integrated logical circuit in the processor 703 or processor 803, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is separately located in the memory 704 and the memory 704. The processor 703 reads information in the memory 704, the processor 803 reads information in the memory 804, and the steps in the method 100 and the method 100 are performed in combination with hardware of the processor 803 and the processor 703. To avoid repetition, details are not described herein again.

It should be noted that, in a specific implementation, the processing module 503 in FIG. 5 may be implemented by the processor 703 in FIG. 7, the sending module 501 may be implemented by the output interface 702 in FIG. 7, and the receiving module 502 may be implemented by the input interface 701 in FIG. 7. Likewise, the processing module 602 in FIG. 6 is implemented by the processor 803 in FIG. 8, the sending module 603 may be implemented by the output interface 802 in FIG. 8, and the receiving module 601 may be implemented by the input interface 801 in FIG. 8.

This application further provides a communications system, including a first network device and a second network device. The first network device may be the first network device provided in the embodiments corresponding to FIG. 5 and FIG. 7. The second network device may be the second network device provided in the embodiments corresponding to FIG. 6 and FIG. 8. The communications system is configured to perform the method 100 in the embodiment corresponding to FIG. 2 to FIG. 4.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL cable) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like. The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to descriptions in the method embodiment.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A load sharing method implemented by a first network device, the load sharing method comprising:
sending data packets to a second network device;
receiving an acknowledgment response from the second network device, wherein the acknowledgment response indicates a usage status of a buffer space of a bonding tunnel reorder buffer of the second network device; and performing, based on the usage status and a load sharing policy, load sharing between a first tunnel and a second tunnel for a packet bound for the second network device, wherein the first tunnel and the second tunnel are between the first network device and the second network device, and wherein the first tunnel and the second tunnel form a bonding tunnel through hybrid bonding.

2. The load sharing method of claim 1, wherein the usage status comprises one of a size of a buffer space in the bonding tunnel reorder buffer or a size of available buffer space in the bonding tunnel reorder buffer.

3. The load sharing method of claim 1, further comprising:

determining, based on the acknowledgment response, a quantity $F_1$ of packets that have not been correctly sorted in the first tunnel, a quantity $F_2$ of packets that have not been correctly sorted in the second tunnel, and a quantity $F_B$ of packets that have not been correctly sorted in the bonding tunnel;

determining a quantity B of packets in the bonding tunnel reorder buffer, wherein $B=F_B-F_1-F_2$; and further determining the usage status based on the quantity B.

4. The load sharing method of claim 3, further comprising:

sending a first part of the data packets to the second network device through the first tunnel;

sending a second part of the data packets to the second network device through the second tunnel;

receiving a first acknowledgment response that is for a first data packet in the first part and that is from the second network device;

determining, based on the first acknowledgment response, a quantity of packets that have entered a first tunnel reorder buffer of the second network device and have been correctly sorted and a quantity M of packets that have entered the bonding tunnel reorder buffer and have been correctly sorted;

receiving a second acknowledgment response that is for a second data packet in the second part and that is from the second network device;

determining, based on the second acknowledgment response, a quantity of packets that have entered a second tunnel reorder buffer of the second network device and have been correctly sorted and a quantity N of packets that have entered the bonding tunnel reorder buffer and have been correctly sorted;

obtaining, based on a quantity of the data packets from the first network device and a larger value in M and N, the quantity $F_B$;

obtaining, based on a quantity of the first part sent to the second network device and the quantity of packets that have entered the first tunnel reorder buffer and have been correctly sorted, the quantity $F_1$; and obtaining, based on a quantity of the second part sent to the second network device and the quantity of packets that have entered the second tunnel reorder buffer and have been correctly sorted, the quantity $F_2$.

5. The load sharing method of claim 4, further comprising:

determining a round-trip time (RTT) of the first tunnel based on a time interval between sending a third data packet in the first part and receiving an acknowledgement response that is for the third data packet and that is from the second network device; and determining an RTT of the second tunnel based on a time interval between sending a fourth data packet in the second part and receiving an acknowledgement response that is for the fourth data packet and that is from the second network device.

6. The load sharing method of claim 1, further comprising:

making a determination that a size of the buffer space used in the bonding tunnel reorder buffer is greater than or equal to a first threshold or a size of available buffer space in the bonding tunnel reorder buffer is less than or equal to a second threshold;

selecting, after the determination and from between the first tunnel and the second tunnel, a selected tunnel with a smaller round-trip time (RTT) or a smaller quantity of packets that have not been correctly sorted; and transmitting a packet to the second network device using the selected tunnel.

7. A load sharing method implemented by a second network device, the load sharing method comprising:

receiving a plurality of data packets from a first network device;

obtaining information about a usage status of a buffer space of a bonding tunnel reorder buffer of the second network device, wherein the bonding tunnel reorder buffer is configured to sort entering packets; and sending an acknowledgment response to the first network device, wherein the acknowledgment response comprises the information to enable the first network device to determine the usage status.

8. The load sharing method of claim 7, wherein the usage status comprises one of a size of a buffer space in the bonding tunnel reorder buffer or a size of available buffer space in the bonding tunnel reorder buffer.

9. The load sharing method of claim 7, further comprising:

receiving a first part of the data packets from the first network device through a first tunnel, wherein each packet in the first part comprises a first bonding tunnel sequence number and a first tunnel sequence number, wherein the first bonding tunnel sequence number indicates a transmission sequence of the packet in a bonding tunnel, and wherein the first tunnel sequence number indicates a transmission sequence of each packet in the first part in the first tunnel;

receiving a second part of the data packets from the first network device through a second tunnel, wherein each packet in the second part comprises a second bonding tunnel sequence number and a second tunnel sequence number, wherein the second bonding tunnel sequence number indicates a transmission sequence of the packet in the bonding tunnel, and wherein the second tunnel sequence number indicates a transmission sequence of each packet in the second part in the second tunnel;

obtaining, before sending the acknowledgment response and from a latest packet that is in a tunnel reorder buffer of the second network device and that has been correctly sorted, a tunnel sequence number and a bonding tunnel sequence number;

determining a first tunnel acknowledgment sequence number according to the tunnel sequence number; and determining a bonding tunnel acknowledgement sequence number comprised in the acknowledgment response according to the bonding tunnel sequence number.

10. A first network device comprising:
a memory; and
a processor coupled to the memory and configured to:
   send data packets to a second network device;
   receive an acknowledgment response from the second network device, wherein the acknowledgment response indicates a usage status of a buffer space of a bonding tunnel reorder buffer of the second network device; and
   perform, based on the usage status of and a load sharing policy, load sharing between a first tunnel and a second tunnel for a packet bound for the second network device,
   wherein the first tunnel and the second tunnel are between the first network device and the second network device, and
   wherein the first tunnel and the second tunnel form a bonding tunnel through hybrid bonding.

11. The first network device of claim 10, wherein the usage status comprises one of a size of a buffer space in the bonding tunnel reorder buffer or a size of available buffer space in the bonding tunnel reorder buffer.

12. The first network device of claim 10, wherein the processor is further configured to:
   determine, based on the acknowledgment response, a quantity $F_1$ of packets that have not been correctly sorted in the first tunnel, a quantity $F_2$ of packets that have not been correctly sorted in the second tunnel, and a quantity $F_B$ of packets that have not been correctly sorted in the bonding tunnel;
   determine a quantity B of packets in the bonding tunnel reorder buffer, wherein $B=F_B-F_1-F_2$; and
   further determine the usage status based on the quantity B.

13. The first network device of claim 12, wherein the processor is further configured to:
   send a first part of the data packets to the second network device through the first tunnel;
   send a second part of the data packets to the second network device through the second tunnel;
   receive a first acknowledgement response that is for a first data packet in the first part and that is from the second network device;
   determine, based on the first acknowledgment response, a quantity of packets that have entered a first tunnel reorder buffer and have been correctly sorted and a quantity M of packets that have entered the bonding tunnel reorder buffer and have been correctly sorted;
   receive a second acknowledgment response that is for a second data packet in the second part and that is from the second network device;
   determine, based on the second acknowledgment response, a quantity of packets that have entered a second tunnel reorder buffer and have been correctly sorted and a quantity N of packets that have entered the bonding tunnel reorder buffer and have been correctly sorted;
   obtain, based on a quantity of the data packets from the first network device and a larger value in M and N, the quantity $F_B$;
   obtain, based on a quantity of the first part sent to the second network device and the quantity of packets that have entered the first tunnel reorder buffer and have been correctly sorted, the quantity $F_1$; and
   obtain, based on a quantity of the second part sent to the second network device and the quantity of packets that have entered the second tunnel reorder buffer and have been correctly sorted, the quantity $F_2$.

14. The first network device of claim 13, wherein the processor is further configured to:
   determine a round-trip time (RTT) of the first tunnel based on a time interval between sending a third data packet in the first part and receiving an acknowledgement response that is for the third data packet and that is from the second network device; and
   determine an RTT of the second tunnel based on a time interval between sending a fourth data packet in the second part and receiving an acknowledgement response that is for the fourth data packet and that is from the second network device.

15. A second network device comprising:
a bonding tunnel reorder buffer configured to sort entering packets;
a memory; and
a processor coupled to the memory and configured to:
   receive a plurality of data packets from a first network device;
   obtain information about a usage status of a buffer space of the bonding tunnel reorder buffer; and
   send an acknowledgment response to the first network device,
   wherein the acknowledgment response comprises the information to enable the first network device to determine the usage status.

16. The second network device of claim 15, wherein the usage status comprises one of a size of a buffer space that has been used in the bonding tunnel reorder buffer or a size of available buffer space in the bonding tunnel reorder buffer.

17. The second network device of claim 15, further comprising a tunnel reorder buffer, wherein the processor is further configured to:
   receive a first part of the data packets from the first network device through a first tunnel, wherein each packet in the first part comprises a first bonding tunnel sequence number and a first tunnel sequence number, wherein the first bonding tunnel sequence number indicates a transmission sequence of the packet in a bonding tunnel, and wherein the first tunnel sequence number indicates a transmission sequence of each packet in the first part in the first tunnel;
   receive a second part of the data packets from the first network device through a second tunnel, wherein each packet in the second part comprises a second bonding tunnel sequence number and a second tunnel sequence number, wherein the second bonding tunnel sequence number indicates a transmission sequence of the packet in the bonding tunnel, and wherein the second tunnel sequence number indicates a transmission sequence of each packet in the second part in the second tunnel;
   obtain, before sending the acknowledgement response and from a latest packet that is in the tunnel reorder buffer and that has been correctly sorted, a tunnel sequence number and a bonding tunnel sequence number;
   determine a first tunnel acknowledgment sequence number according to the tunnel sequence number; and
   determine a bonding tunnel acknowledgement sequence number comprised in the acknowledgment response according to the bonding tunnel sequence number.

18. The second network device of claim 15, wherein the information comprises a quantity of packets in the bonding tunnel reorder buffer, a length of a packet queue in the bonding tunnel reorder buffer, or a quantity of buffer slices that have been used in the bonding tunnel reorder buffer when the usage status comprises a size of the buffer space that has been used in the bonding tunnel reorder buffer.

19. The second network device of claim 18, wherein the acknowledgment response comprises one of:
- a generic routing encapsulation (GRE) data packet comprising a bonding reorder buffer size field, wherein the bonding reorder buffer size field carries the quantity of packets in the bonding tunnel reorder buffer, a length of the packet queue in the bonding tunnel reorder buffer, an available length of a packet buffer queue in the bonding tunnel reorder buffer, the quantity of buffer slices that have been used in the bonding tunnel reorder buffer, or a quantity of available buffer slices in the bonding tunnel reorder buffer; or
- a GRE control packet comprising an attribute type-length-value (TLV) field, wherein the attribute TLV field comprises a type T field, a length L field, and a value V field, and wherein the value V field carries the quantity of packets in the bonding tunnel reorder buffer, the length of the packet queue in the bonding tunnel reorder buffer, the available length of the packet buffer queue in the bonding tunnel reorder buffer, the quantity of buffer slices that have been used in the bonding tunnel reorder buffer, or the quantity of available buffer slices in the bonding tunnel reorder buffer.

20. The second network device of claim 15, wherein the information comprises an available length of a packet buffer queue in the bonding tunnel reorder buffer or a quantity of available buffer slices in the bonding tunnel reorder buffer when the usage status comprises a size of available buffer space in the bonding tunnel reorder buffer.

* * * * *